(12) United States Patent
Muttineni et al.

(10) Patent No.: US 10,089,653 B2
(45) Date of Patent: *Oct. 2, 2018

(54) SYSTEM AND METHOD FOR ESTIMATING MOBILE DEVICE LOCATIONS

(71) Applicant: XAD, INC., New York, NY (US)

(72) Inventors: Prakash Muttineni, San Ramon, CA (US); Nishant Khatri, Santa Clara, CA (US); Srihari Venkatesan, Cuppertino, CA (US); Chi-Chao Chang, Palo Alto, CA (US); Huitao Luo, Fremont, CA (US); Mauricio Mediano, Campbell, CA (US); Dipanshu Sharma, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 15/890,083

(22) Filed: Feb. 6, 2018

(65) Prior Publication Data
US 2018/0158108 A1    Jun. 7, 2018

Related U.S. Application Data

(63) Continuation of application No. 14/716,816, filed on May 19, 2015, now Pat. No. 9,886,703, which is a (Continued)

(51) Int. Cl.
*H04W 4/02* (2018.01)
*G06Q 30/02* (2012.01)
(Continued)

(52) U.S. Cl.
CPC ... *G06Q 30/0261* (2013.01); *G06F 17/30867* (2013.01); *G06Q 30/0205* (2013.01);
(Continued)

(58) Field of Classification Search
CPC .............................. H04W 4/02; H04W 4/028
See application file for complete search history.

(56) References Cited

U.S. PATENT DOCUMENTS 9,049,549 B2* 6/2015 Chang ................ G06Q 30/0205
9,886,703 B2* 2/2018 Muttineni ............. H04W 4/029
(Continued)

*Primary Examiner* — Kamran Afshar
*Assistant Examiner* — Farideh Madani
(74) *Attorney, Agent, or Firm* — Morgan, Lewis & Bockius LLP

(57) ABSTRACT

A method performed by one or more computer systems coupled to a packet-based network to determine the location of a mobile device comprises receiving a set of input signals associated with the mobile device from the packet-based network. The set of input signals include a plurality of location components and context information. The method further comprises determining whether the set of input signals include a pair of latitude/longitude coordinates, and determining whether the pair of latitude/longitude coordinates are valid using a set of criteria. The method further comprises defining at least some of the set of criteria using historical data associated with a plurality of mobile devices communicating with the packet-based network. The method further comprises deriving the location of the mobile device using one or more other location components of the plurality of location components and the context information, in response to the pair of latitude/longitude coordinates being marked as invalid.

18 Claims, 20 Drawing Sheets

Related U.S. Application Data continuation-in-part of application No. 13/867,021, filed on Apr. 19, 2013, now Pat. No. 9,049,549.

(60) Provisional application No. 62/000,501, filed on May 19, 2014, provisional application No. 61/724,298, filed on Nov. 8, 2012, provisional application No. 61/724,299, filed on Nov. 8, 2012, provisional application No. 61/724,295, filed on Nov. 8, 2012.

(51) Int. Cl.
    *G06F 17/30*     (2006.01)
    *H04L 29/08*     (2006.01)
    *H04W 4/021*     (2018.01)
    *H04W 4/029*     (2018.01)

(52) U.S. Cl.
    CPC ......... *G06Q 30/0267* (2013.01); *H04L 67/20* (2013.01); *H04W 4/02* (2013.01); *H04W 4/021* (2013.01); *H04W 4/023* (2013.01); *H04W 4/029* (2018.02)

(56) References Cited

U.S. PATENT DOCUMENTS

| | | | | |
|---|---|---|---|---|
| 2009/0005987 | A1* | 1/2009 | Vengroff | G06Q 30/02 701/300 |
| 2009/0187388 | A1* | 7/2009 | Shu | G06K 9/00214 703/2 |
| 2012/0066066 | A1* | 3/2012 | Jain | G06Q 30/0261 705/14.58 |
| 2014/0057650 | A1* | 2/2014 | Versteeg | G01S 5/0252 455/456.1 |
| 2014/0067938 | A1* | 3/2014 | Boldyrev | H04W 4/029 709/204 |
| 2014/0344718 | A1* | 11/2014 | Rapaport | H04L 51/32 715/753 |

* cited by examiner

| IP Address | Spatial Index | Centroid | Other Information |
|---|---|---|---|
| 194.66.82.11 | a1, a2, ..., ai | ------- | ------- |
| 196.45.3213 | b1, b2, ..., bj | ------- | ------- |
| 198.65.32.47 | c1, c2, ..., ck | ------- | ------- |
| 199.33.63.43 | d1, d2, ..., dl | ------- | ------- |
| 201.36.76.23 | e1, e2, ..., em | ------- | ------- |
| 207.15.63.32 | c1, c2, ..., ck | ------- | ------- |
| 222.31.113.64 | f1, f2, ..., fn | ------- | ------- |
| ...... | ...... | ...... | ...... |

FIG. 12

SYSTEM AND METHOD FOR ESTIMATING MOBILE DEVICE LOCATIONS

CROSS REFERENCE TO RELATED APPLICATIONS

The present application is a continuation of U.S. patent application Ser. No. 14/716,816, filed May 19, 2015, to be issued as U.S. Pat. No. 9,886,703 on Feb. 6, 2018, which claims the benefit of priority from U.S. Provisional Patent Application No. 62/000,501, filed May 19, 2014, and is a continuation-in-part of U.S. patent application Ser. No. 13/867,021, filed Apr. 19, 2013, now U.S. Pat. No. 9,049,549, which claims the benefit of priority from U.S. Provisional Application No. 61/724,295 entitled "Method and Apparatus for Probabilistic User Location," filed on Nov. 8, 2012, U.S. Provisional Application No. 61/724,298 entitled "Method and Apparatus for Dynamic Fencing," filed on Nov. 8, 2012, and U.S. Provisional Application No. 61/724,299 entitled "Method and Apparatus for Geographic Document Retrieval," filed on Nov. 8, 2012, each of which is incorporated herein by reference in its entirety. The present application is related to co-pending U.S. patent application Ser. No. 13/867,025, filed Apr. 19, 2013, U.S. patent application Ser. No. 13/867,029, filed Apr. 19, 2013, and U.S. patent application Ser. No. 14/716,811, filed May 19, 2015, each of which is incorporated herein by reference in its entirety.

FIELD

The present disclosure is related to location-based mobile applications, and more particularly to system and method for estimating mobile user location.

DESCRIPTION OF THE RELATED ART

With the widespread use of mobile devices such as smart phones, many mobile applications provide services to users based on their locations. For example, user locations can be used to decide what advertisement (ad) to serve on mobile devices. User location data is typically provided by mobile applications, publishers, and client-side software and represented by latitude and longitude coordinates (LL), IP addresses (IP), postal or zip codes (ZC), and city-state names (CS), as well as a combination thereof. Ad servers generally apply a set of heuristics based on assumptions about the accuracy and granularity of this data, and process them based on a deterministic interpretation of their meanings. In other words, it interprets the location data literally: the user is at a LL coordinate, or the user is in Palo Alto, Calif., or the user resides in zip code 94304 if the meaning is provided by a mobile application who claims they send along ZCs representing the homes of the users with explicit consent.

Such deterministic interpretation of location has been a standard practice in the industry since the advent of ad marketplace for mobile devices for at least the last five years. It is fundamentally flawed because one is never certain where the user actually is at the time when the Ad servers process the data, even if one assumes that the data is correct. For example, suppose a user is travelling at 55 miles per hour down a highway and accessing a mobile application. By the time a request is issued to the server with an LL coordinate and a banner ad is returned and fully rendered in the application, the actual location of the user is no longer at the same LL. Similar examples can be constructed using ZC and city-state boundaries around the fringes and boundaries of these arbitrary areas.

SUMMARY

A novel system and method of dealing with the inherent uncertainty in user location data, particularly in a mobile world, involves generating a probabilistic user location representation. In some embodiments, this is done by using validation, context analysis, creation of consistent groups, and probability allocation procedures. Location-based document retrieval can be enabled using the probabilistic user location representation.

In some embodiments, a method of delivering location-based information is carried out by a computer system coupled to a packet-based network and executing computer program instructions stored in a storage device. The method comprises receiving a request from the packet-based network. The request includes a location indicator, and the location indicator includes at least one of: (1) a code associated with a place or region (e.g., a zip code), (2) a name associated with a place or region (e.g., city, state, etc.), (3) geographical coordinates (e.g., longitude/latitude), and (4) a network address (e.g., Internet Protocol (IP) address). The method further comprises translating the location indicator into a probabilistic representation of one or more possible locations of a mobile user based on the location indicator and historical data collected from mobile devices communicating with the packet-based network. The computer system has access to one or more data stores storing therein the historical data. The request with the probabilistic representation is used to retrieve information relevant to the one or more possible locations of the mobile user from a computer readable medium in the same or different data store, for delivery to the mobile user via the packet-based network.

In certain embodiment, the IP address is used to translate the location indicator into a probabilistic representation of one or more possible locations of a mobile user. In certain embodiments, an IP region for a particular IP address is derived from a plurality of requests made over certain period of time, each of the plurality of requests including the particular IP address and GPS based location data (e.g., longitude/latitude or LL). The particular IP address may be associated with a stationary device like a router to which a mobile device can be connected through WiFi to a packet-based network (e.g., the Internet). Thus, when a new request comes in with this particular IP address and unreliable LL (or no LL), the IP region is used as a probable location for the new request, and advertisement can be served based on this probable location. In certain embodiments, the IP region has a center and a size, and the center of the IP region can be used as an approximate location for the mobile user associated with the new request, with the inverse of the size serving as a measure of certainty for the location. Or, the entire boundary of the IP region can be used as a probable area for the location of the mobile user.

BRIEF DESCRIPTION OF THE DRAWINGS

FIG. 12 illustrates a few examples of IP regions stored in the database as spatial indices together with the associated IP addresses and other information such as their respective centroids, etc. according to certain embodiments.

DESCRIPTION OF THE EMBODIMENTS

Figure 1A:
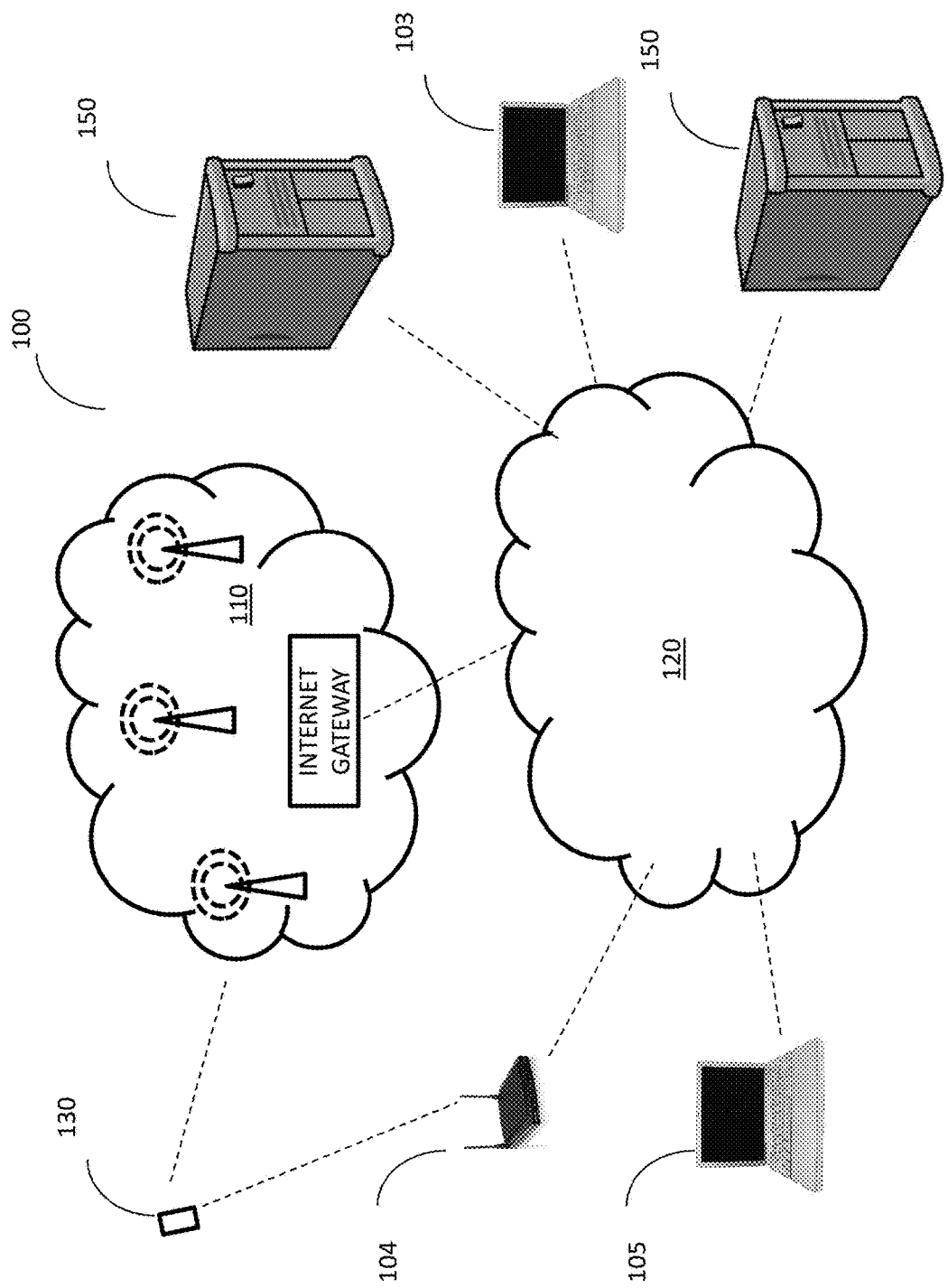
FIG. 1A is a diagram illustrating a packet-based network via which a mobile device may interact with one or more servers according to one embodiment of the present disclosure.

A novel method and apparatus for probabilistic user location (i.e., smart location) is developed to represent user locations in a probabilistic manner. In one embodiment, traditional location data is translated into smart location information or smart location data, which can be probabilistic representations of user locations based on historical, aggregate data collected from many requests from mobile devices. For example, conventional location input data types, e.g., strings, integers, are converted into structures storing two-dimensional density functions, which represent the likelihood of a user being at a given coordinate. In other words, points in a map rather than integers (such as "94304") and strings (such as "Palo Alto, Calif.") are used to represent user locations.

In one embodiment, a probabilistic user location model is provided where a user is associated with multiple regions with different probabilities in response to a request including information about various input signals (LL, IP, ZC, CS) as well as additional context including time of the day. Afterwards, a spatial representation of a user location can be derived by:

1. Using of an arbitrary polygon for each location region, which is no longer confined to a ZC, city, DMA etc.;
2. Providing variable granularity, which could be smaller than a ZC, or larger than a ZC) since a single region could span multiple ZCs (or cities) along the boundaries; and
3. Using multiple polygons for a user's approximated location.

Validation and allocation procedures that use probability distributions to deal with uncertain data are then used to derive a user's spatial location representation.

In a further embodiment, the accuracy of user location is measured in a statistical setting based on user feedback data (such as click-through rates and secondary action rates).

In a further embodiment, conditions under which an IP can be treated as a proxy to user identity over a period of time (e.g., a few days) can be determined, and associated locations are exploited as probable regions to select from when this IP comes with a request over a subsequent period of time. IPs as proxies for users, whenever applicable, can improve the ability to deliver more relevant advertisement to this particular IP or user.

In some embodiments, weights distributions act as proxies to true locations, and business location information (e.g., information coming from publishers and 3rd party data sources) can be used to correlate, correct, and resolve uncertainty in location data. For example, information from publishers can be used to assign publisher specific weights based on location type. In a further example, the probabilities derived from weights influence decisions at serving time, and new weights are derived from these decisions, thus introducing a feedback loop. Using such data-driven optimization, improved accuracy can be obtained as the volume of historical data accumulated over time increases. The accuracy should also increase as the region representation includes more points.

In some embodiments, the ability to find and retrieve relevant ads (fill-rate and/or CTR) can be enhanced through the use of allocation procedures that distribute incoming requests to smaller regions within a ZC following request distribution of good LLs.

Although most of the embodiments are described herein in the context of mobile advertisement, the techniques associated therewith can have widespread applications, including, but not limited to:

1. Ad networks, where the location is used as a feature to return relevant ads.
2. Social networks, where friends' activities are correlated by location, to suggest friends or communities with shared interest by location.
3. Surveillance, tracking, to find people, deal with emergencies, track progress of field employees, etc.
4. Search, to provide relevant results using location to disambiguate results.
5. Travel and local, to suggest interesting places for people traveling and exploring locations.

In some embodiments, the smart location information can be annotated and piped into ranking models. For example, a service can be called to return a set of documents whose geographical locations intersect regions associated with the smart location information, i.e., smart location regions. The smart location regions, the documents returned and the information that joins them (e.g. area intersected), are fed into a model that ranks and filters the documents. For ad networks, this service could be a geographical document retrieval service described in the commonly assigned co-pending U.S. patent application Ser. No. 13/867,029, filed Apr. 19, 2013, entitled "Method and Apparatus for Geographical Document Retrieval." Similar services could also fit the other applications above.

Figure 1B:
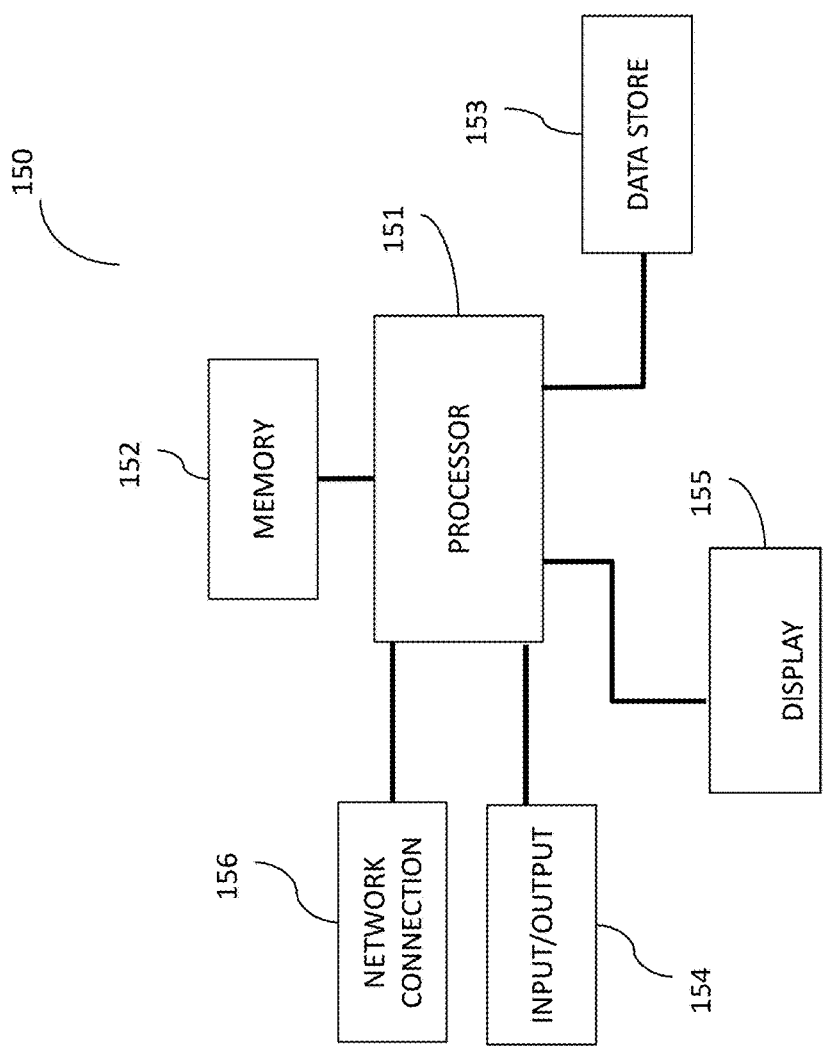
FIG. 1B is a block diagram illustrating a computer system that can be used to carry out a method for smart location according to one embodiment of the present disclosure.

FIG. 1A illustrates a packet-based network 100 (referred sometimes herein as "the cloud"), which, in some embodiments, includes part or all of a cellular network 110, the Internet 120, and computers and servers 150 coupled to the Internet. The computers and servers 150 can be coupled to the Internet 120 using wired Ethernet and optionally Power over Ethernet (PoE), WiFi, and/or cellular connections. As shown in FIG. 1B, a mobile device 130 such as a smart phone is also coupled to the packet-based network via WiFi or cellular connections. When a WiFi hotspot (such as hotspot 104) is available, the mobile device 130 may connect to the Internet via the WiFi hotspot using its built-in WiFi connection. Mobile device 130 may also communicate with the cellular network using its built-in cellular connection to connect to the cellular network 110, which is coupled to the Internet 120 via an Internet Gateway. Thus, the mobile device may interact with other computers/servers coupled to the Internet.

As shown in FIG. 1B, the computers/servers 150 coupled to the Internet may include one or more computers/servers that is used to execute one or more software programs to carry out one or more methods of location-based document retrieval of certain embodiments, one or more computers/servers associated with a mobile publisher, one or more computers/servers 150 associated with an on-line marketer, and other computers/servers.

In one embodiment, the one or more methods of location-based document retrieval are performed using a computer system (e.g., a server computer) executing one or more software programs. FIG. 1B is a block diagram of an example of such a computer or server system 150, which includes a processor 151, a memory 152, one or more data stores 153, input/output devices 154 such as keyboard/mouse/touchscreen, one or more display devices 155, such as a monitor, a wired and/or wireless connections 156 to a network, such as a local area network and/or a wide area network (e.g., the Internet 120). The software programs can be stored in a computer readable medium (such as a data store 153 and or other portable computer readable medium that is not shown). When loaded in the memory 152 and executed by the processor 151, the software programs cause the processor to carry out the smart location method and/or any of the other methods described herein. In one embodiment, location-based documents/information and historical, aggregate data collected from many requests from mobile devices are also store in the data store 153. The one or more data stores 153 can be computer readable media local to the processor 151 or coupled to the processor via a local or wide-area network.

Figure 1C:
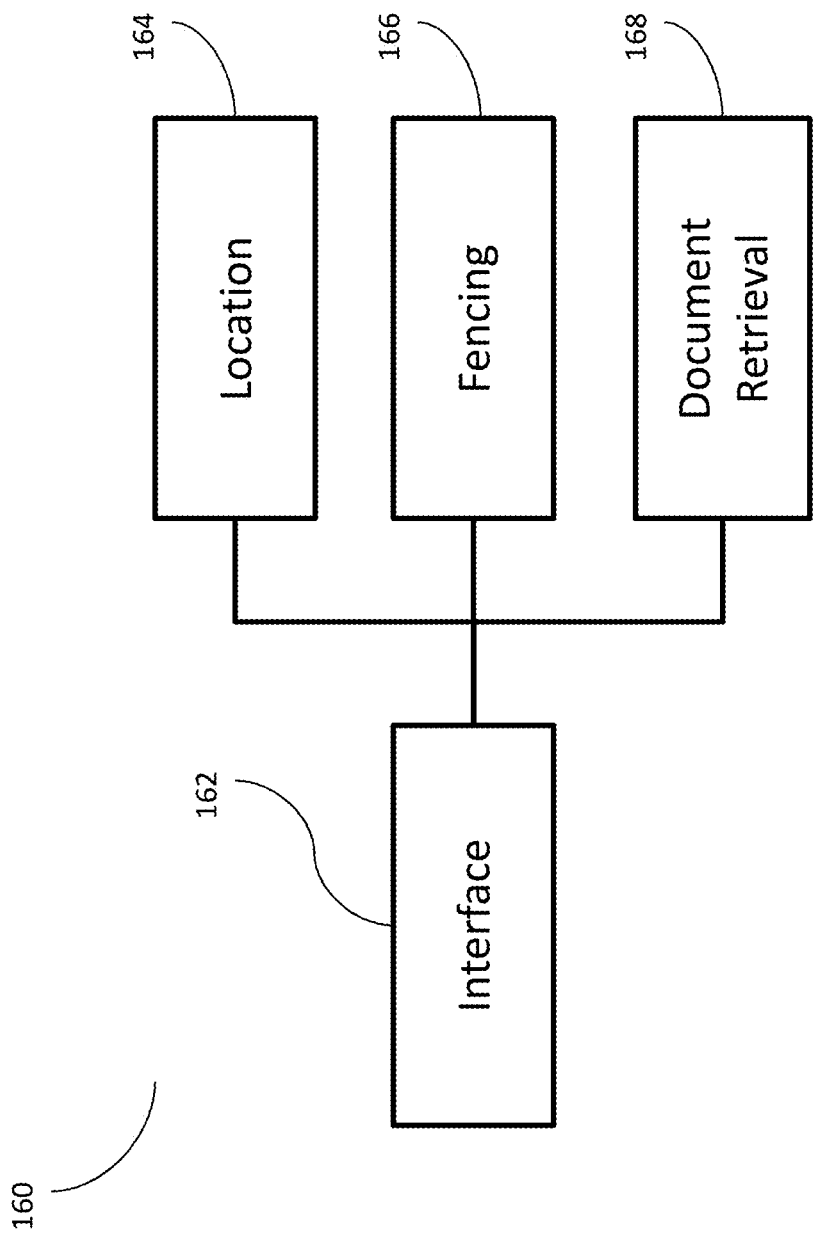
FIG. 1C is a block diagram illustrating a few software engines in the computer system that can be used to carry out the method for smart location.

As shown in FIG. 1C, in one embodiment, the one or more servers 150 executing the software programs may provide one or more software engines or application programming interfaces (API) 160, including, for example, an interface engine 162 and a location engine 164. In a further embodiment, the one or more servers 150 executing the software programs may also include a fencing engine 166 and/or a document retrieval engine 168.

Figure 2:
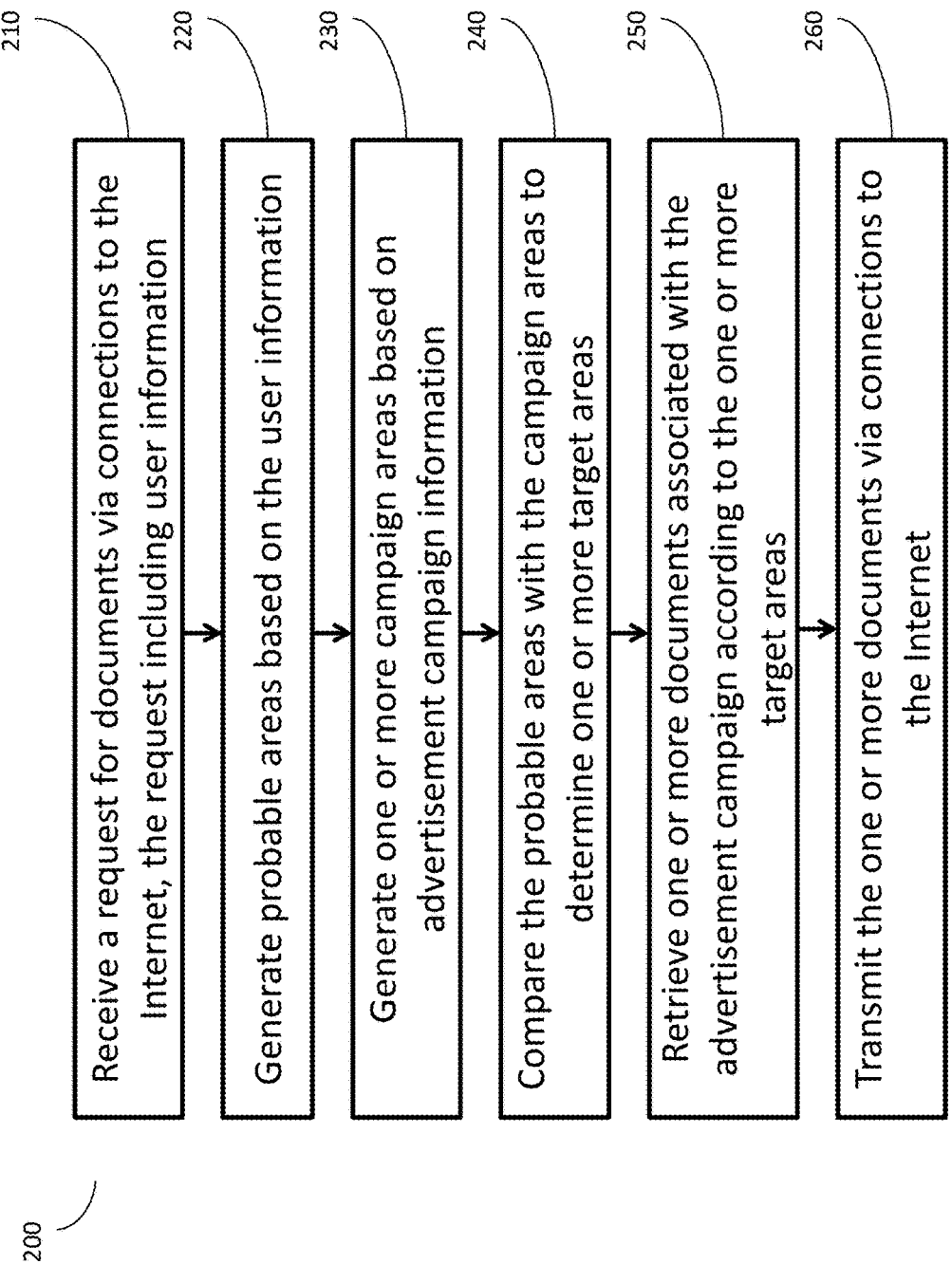
FIG. 2 is a flowchart illustrating a method for location-based document delivery according to embodiments of the present disclosure.

FIG. 2 is a flowchart illustrating a method 200 carried out by the one or more servers executing the software programs. According to one embodiment, in the context of on-line advertisements, the interface engine 162 is used to receive in 210 a request for documents via connections 156 to the Internet 120. The request includes information associated with a mobile user ("user information"). The location engine 164 is used in 220 to generate, using one or more methods described below, one or more probable areas or regions where a user of a mobile device 130 ("mobile user") could be located based on the user information received by the interface engine 162 via the Internet 120 from one or more mobile publisher, with whom the mobile user has initiated interaction using the mobile device 130 via one or more web services provided by the mobile publisher. The user information may be received in the form of, for example, a request for an advertisement ("ad request"). Each of the probable regions is associated with a probability of the user being in that region.

The one or more probable areas associated with the mobile user can be compared (e.g., overlapped) in 240 with certain fenced areas (or campaign areas) associated with advertisement campaigns to determine one or more target areas using the fencing engine 166. The fenced areas can be areas specified by marketers, such as cities, states, areas associated with shopping malls or shops, tourist attractions or certain zip codes. Or, the fenced areas can be arbitrary and dynamic areas generated in 230 using the fencing engine. For example, apparatus and method described in the commonly-assigned co-pending U.S. patent application Ser. No. 13/867,025, filed Apr. 19, 2013, entitled "Method and Apparatus for Dynamic Fencing," can be used to generate the fenced areas.

In one embodiment, each target area has an associated probability. The target areas, represented in some embodiments as points in a map, and information associated therewith can be used as inputs to the document retrieval engine 168 to retrieve one or more documents (e.g., advertisement) in 250 to be delivered to the user using the interface engine in 260. In one embodiment, the document retrieval engine chooses an advertisement associated with a target area with the highest probability. In another embodiment, the document retrieval engine performs a coin toss using the probabilities associated with the target areas as weight to choose an advertisement for delivery in response to the ad request. In a further embodiment, apparatus and method described in the in the co-pending U.S. patent application Ser. No. 13/867,029, filed Apr. 19, 2013, entitled "Method and Apparatus for Geographical Document Retrieval," can be used to retrieve the document. The interface engine 162, location engine 164, fencing engine 166 and document retrieval engine 168 can be provided by one computer/server 150 or multiple computers/servers 150.

A direct application of probabilistic user location is for improving the ability to find and serve relevant advertisements to users interacting with mobile applications on smartphone and tablet devices. In this setting, the user is constantly in movement, and a key challenge in ad technology is to fill as many ad requests as possible with ads that are locally relevant to users. Fundamentally, the task of serving an advertisement is a probabilistic one, and as a result, it calls for solutions based on statistical modeling and machine learning techniques, all of which strive on massive volumes of data.

In one embodiment, a two-dimensional, statistical representation of user location data is used to enable novel forms of data-driven optimizations that can be implemented in other components of an ad technology stack. In the related Dynamic Fencing Application, systems and methods for generating dynamic geo-fences for advertisements are also based on two-dimensional statistical representations of user locations. In certain embodiments described in the related co-pending U.S. patent application Ser. No. 13/867,029, filed Apr. 19, 2013, entitled "Method and Apparatus for Geographical Document Retrieval," such ads are matched with ad requests annotated with probabilistic user locations.

To comply with privacy laws, a user's location information is not tracked to know where a user is at any given time, unless a user voluntarily allows an application to use his/her current location in order to receive better service. When allowed, LL is believed to be a signal of high fidelity. However, even LLs may not be accurate depending on a number of factors such as:
1. Client-side GPS service works intermittently due to economical battery usage,
2. Carriers sample the location at regular intervals only, and
3. Constant user movement.

When a user doesn't allow his/her location information to be known, applications typically provide only coarse location data in the form of, for example, IP address of the device, a ZC (e.g. entered by the user at the time of registration), or CS.

Mobile applications and publishers frequently provide LLs obtained from geo-coding software, which translates ZC, CS, and other points of interests into one representative LL. In one embodiment, such representative LLs is categorized as "bad LLs". The bad LLs can be, for example:
1. A centroid of a ZC/CS
2. Any fixed point on a map (e.g. (0,0) or an arbitrary location)

The problem with bad LLs is obvious: by reducing a 2D region into a single point, information is lost. Furthermore, when centroids are passed along to downstream services (such as ad servers), it misleads the ad server to think that the LL is the actual location of the user.

IP to location mapping software is commonly used in the industry to obtain CS, and sometimes ZC, LL, from a given IP. Such techniques suffer from various limitations:
1. A single IP could be allocated to different users at different times, and a single user could be allocated multiple IPs, depending on carrier, Internet Service Providers (ISPs), whether or not the device's communication mode changed at different times
2. Depending on the ISP/carrier, the allocation of IPs could be related to "local" geography
3. Once an IP is allocated, it remains with the user even if he moves out of the current CS, as long as the communication mode is not changed
4. ISPs use Network Address Translation, and hence the IP passed could represent a stationary location that is common to multiple users (and each user gets a unique internal IP)
5. Cell phones could use Wi-Fi to connect to the Internet, and the IP in this case would represent the Wi-Fi spot, and could further be subject to change over time as it could get the address from the ISP, and could be internal to the ISP. Even these IPs could change depending on whether or not the router is restarted, and hence not tied to this location always A key limitation of deterministic user location is that a predetermined order of priority among the various location data is assumed in most implementations. For example, LL is assumed to be more accurate than ZC, which in turn is more reliable than CS, which in turn is more reliable than IP mappings, etc. As a result, there is a lack of ability to associate levels of uncertainty to one or more location inputs.

Another limitation is that deterministic locations lead to a trivialization of location-based ad retrieval, making it as straightforward as string or integer matching. For example, an input location of Palo Alto, Calif. is treated as a string, and should only match ads that are located or targeted to Palo Alto, Calif. A ZC of 94304 should only match ads located in or targeted to 94304. The notion of neighborhoods (e.g. Palo Alto Hills or Barron Park) is lost and can only be recuperated with static dictionaries (e.g. mapping names to neighborhoods, ZCs to cities) as well as string manipulations (e.g. partial string matches).

This trivialization has led to a stagnation of location-based document retrieval technologies over the last decade as text-search engines and related techniques addressed most requirements for advertising. With the hyper-growth of mobile traffic which can generate trillions of ad requests annotated with fine-grained location data, innovations in geographic document retrieval is necessary for serving highly relevant local advertisements.

In one embodiment, the location engine 164 employs a smart location method 300 to generate one or more probable areas or regions where a user of a mobile device 130 ("mobile user") could be located. The smart location method 300 takes as input user information in a request for documents from a mobile publisher or application provider, such as:
1. Request Specific Information
   1. Location
      1. Latitude, longitude (LL)
      2. Zip code (ZC)
      3. City-state (CS)
      4. IP address (IP)
   2. Context
      1. Timestamp (Hour of day, Day of week etc.)
      2. User Identifier (UID) (could include other attributes that help identify a user)
      3. Publisher
2. Mapping data
   1. Location to corresponding spatial region (ZC/CS to a bounding polygonal region) along with their sizes
   2. Weight distribution (from display and search traffic) for these spatial regions
   3. Split of each of these spatial regions into a set of smaller regions, and weight (ex: requests) distributions over these smaller regions In one embodiment, the smart location method 300 generates a spatial representation of location, which is a set of regions with associated probabilities for smart matching downstream:

$$\text{SmartLocation} = (R_1, p_{R_1}, R_2, p_{R_2}, \ldots, R_k, p_{R_k})$$

where a region, $R_k$, is defined as $$R_k = (P_1, P_2, \ldots, P_m)$$

where a point, $P_m$, is given by $$P_m = (\text{Latitude}_m, \text{Longitude}_m)$$

and, $p_{R_k}$ represents the probability of region k and all probabilities of a SmartLocation add up to 1.

By representing a region as a set of points, the resolution of a region can be set to arbitrary levels depending on the number of points. For example, a region with three points can be used to encode a triangular-shaped region, four points a rectangular-shaped region, etc.

A ZC region, or ZC level region indicates a region derived from a ZC. Similarly, a CS region is a region derived from a CS. A smaller region is a region within a ZC region or a CS region. One simple way of dividing a ZC region into such smaller regions is by looking only at the first 3 (or 4 or 5) digits of lat/longs (for example, (30.000, −122.122) and (30.001, −122.123) may correspond to two opposite corners of a rectangular smaller region obtained by keeping 3 decimal digits).

Figure 3:
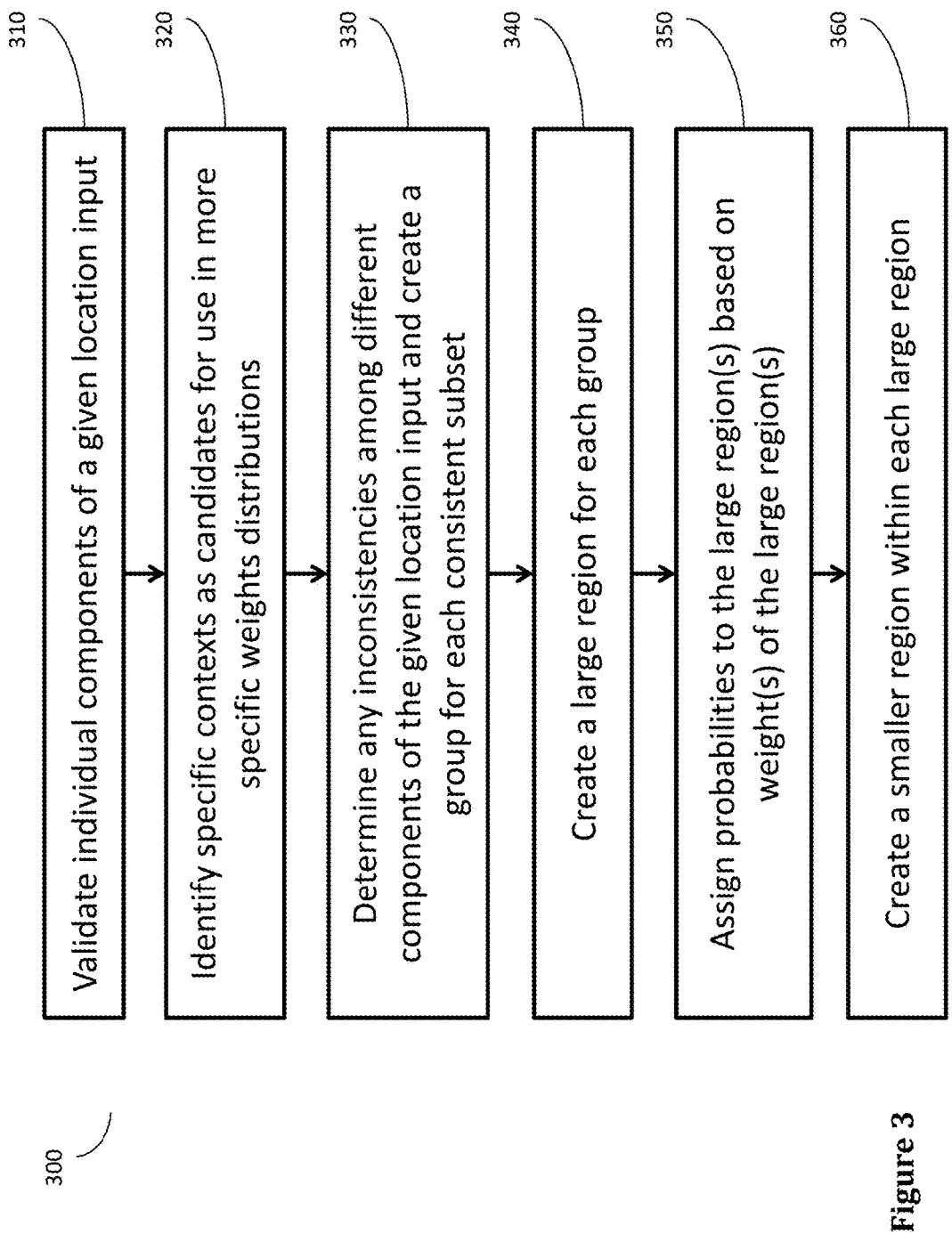
FIG. 3 is a flowchart illustrating a method for smart location according to embodiments of the present disclosure.

As shown in FIG. 3, the smart location method 300 of certain embodiments includes a validation phase 310 in which validation of individual components of a given location input is made and invalid components are ignored or discarded. The method 300 further includes an analysis of context phase 320 where specific contexts are identified as candidates for use in more specific weights distributions, and a groups creation phase 330 where inconsistencies among different components of the given location input is determined, and a separate group is created for each consistent subset. The method 300 further includes a large region creation phase 340 where a large region is created (typically at ZC or CS level) for each group, and a probability allocation phase 350 where probabilities are assigned based on weights of large regions of each group. The method 300 may further include an optional smaller region creation phase 360, in which a smaller region is created within each large region. For good LLs, the smaller regions are created based on sizes of regions, and for no LLs, or bad LLs, they are created based on weights distribution. In one embodiment, as the smaller regions are created, the probability of a large region is split between a newly created smaller region within the large region and that large region itself.

Data Mapping Examples

Figure 4A:
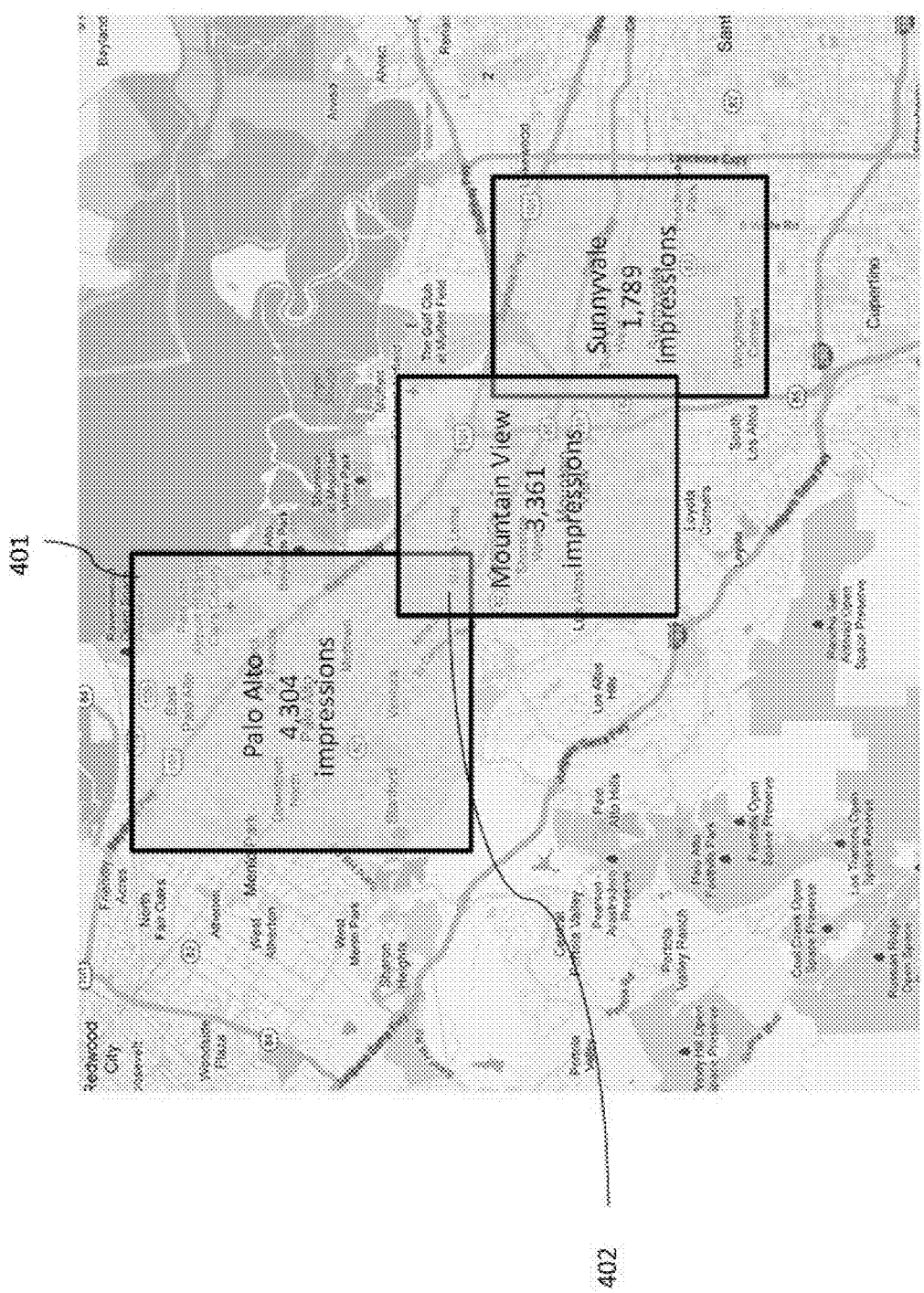
FIGS. 4A and 4B are diagrams illustrating CS and ZC regions with their associated weights according to embodiments of the present disclosure.
Figure 4B:
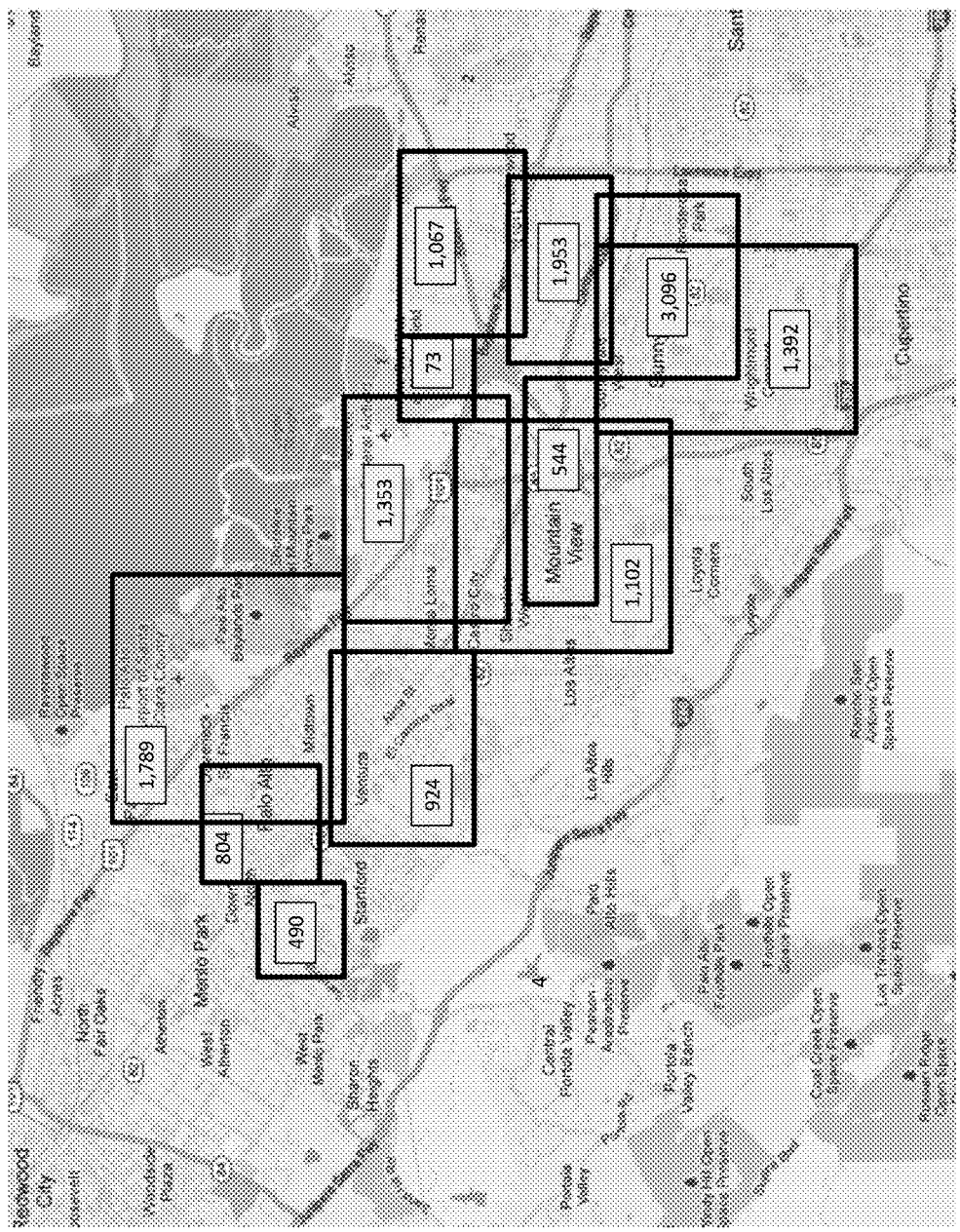

FIG. 4A illustrates CS regions 401 along with their weights (impressions). FIG. 4B illustrates ZC regions 401 along with their weights (impressions). FIG. 4A and FIG. 4B give examples of CS and ZC regions, respectively, as bounding rectangular boxes (although these can be of any other shape too). Note that these bounding boxes can overlap, and any LL that falls within an overlapped region can lead to both the partially overlapping regions 401 being associated with that LL. The numbers within each of the regions represent a "weight" associated with that region which can be used to allocate probabilities as explained further below. The weight could be any metric such as impressions, requests, CTR etc. Such terms, e.g., "weights", "impressions", and "requests" can be used interchangeably in the rest of the document.

When a request with input location (IP, LL, ZC, CS) comes and some of these location data are potentially null, there are 4 distinct cases that are possible, as described in the following as Case 1, Case 2, Case 3, and Case 4.

Figure 5A:
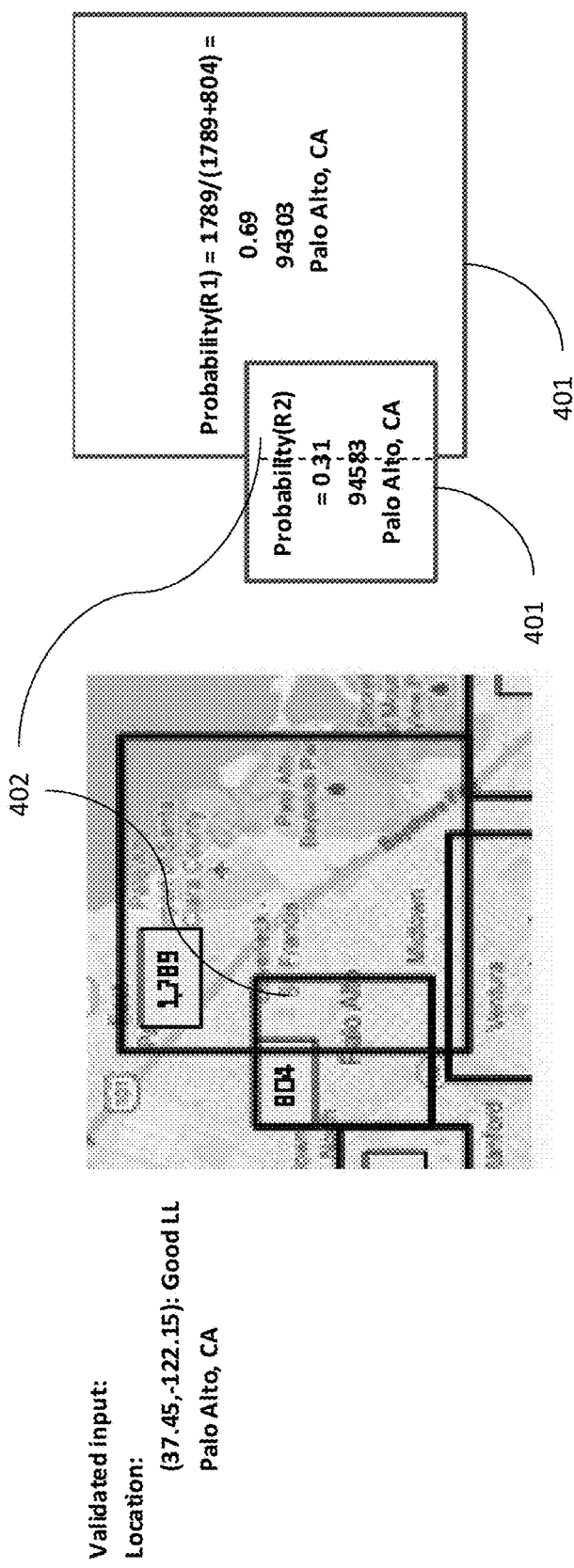
FIGS. 5A and 5B are diagrams illustrating probability allocations based on weights according to embodiments of the present disclosure.

Case 1: Overlapping regions—assume the given LL belongs to an overlapped region of two different ZCs or two different CSs. In FIG. 4B, a LL that falls in the intersection 402 of ZCs with 804 and 1789 impressions is another example of this case. When this happens, as shown in FIG. 5A, the probability is distributed among such overlapping regions according to their weights as illustrated.

Figure 5B:
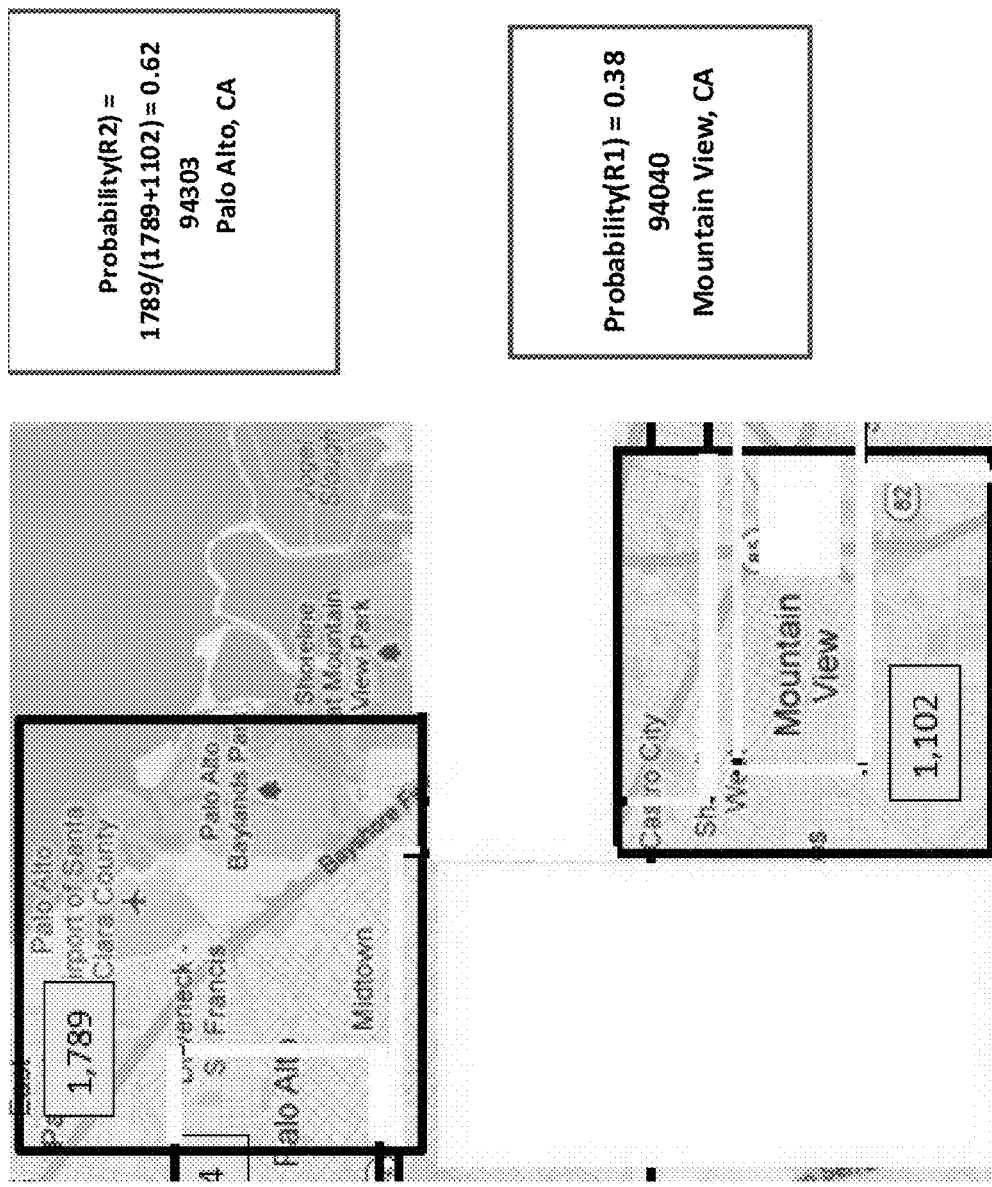

Case 2: Disjoint regions—assume the given LL belongs to a non-overlapping region of one ZC, but IP leads to another ZC through IP to geo mapping database. For example, in FIG. 4B, an LL may fall purely within the 94303 ZC with 1789 impressions, while an IP may lead to 94040 ZC in Mountain View. When this happens, as shown in FIG. 5B, similar to Case 1 with overlapping regions, the probability is distributed among such non-overlapping regions according to their weights as illustrated.

Figure 6:
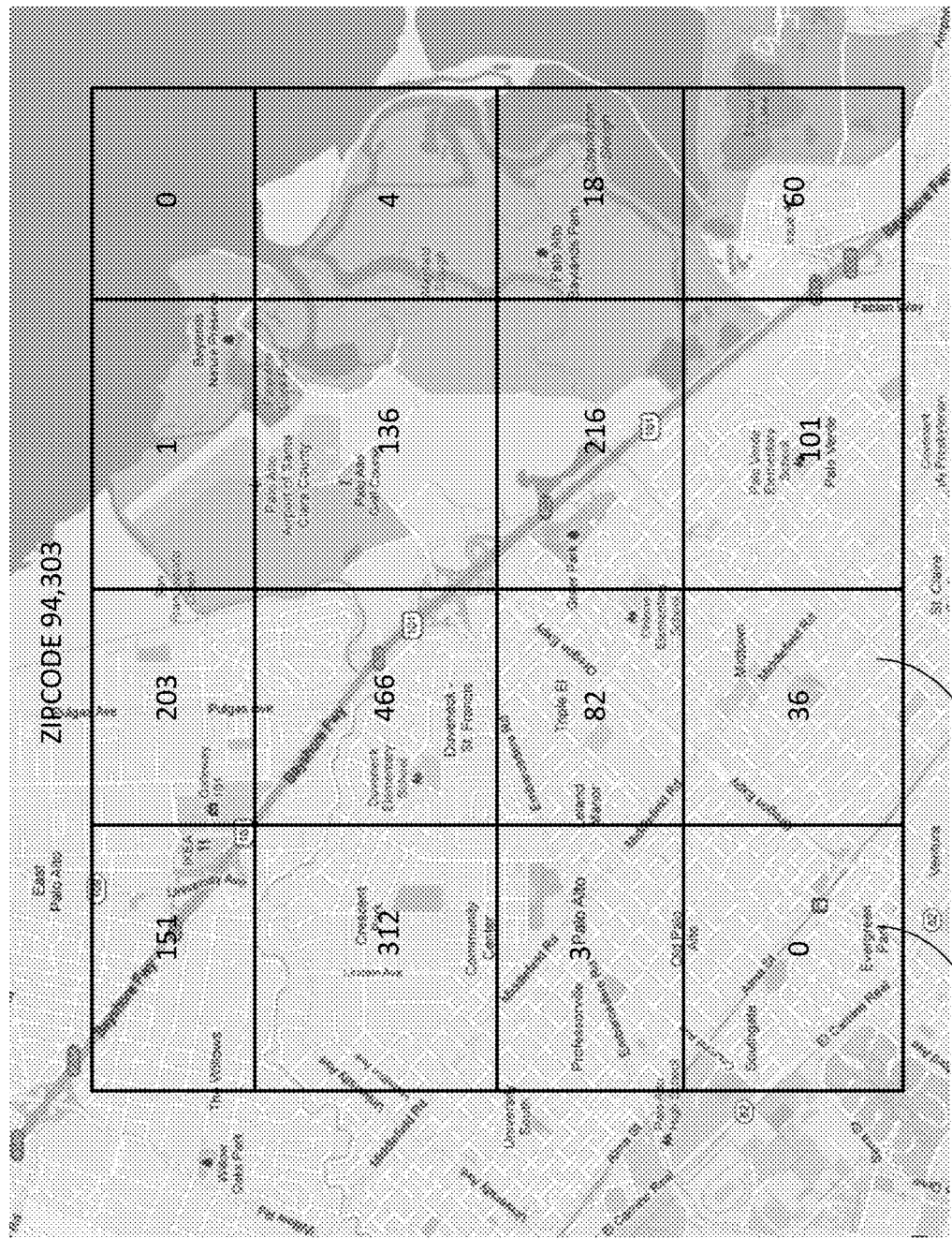
FIG. 6 is a diagram illustrating a ZC region divided into smaller regions in a grid according to an embodiment of the present disclosure.

Case 3: Embedded region—bad LL—Smaller Regions: FIG. 6 illustrates the weight (e.g., impressions) associated with a larger ZC region 601 (e.g., ZC 94303) being distributed among smaller regions 602 on a grid. The number within the smaller region indicates the weight (impressions) associated with that smaller region. The total weight of all smaller regions can add up to the larger region's weight. The weight used here is again the number of impressions. Although the figure shows a distribution for a ZC, similar approach is used for dividing CS regions too.

Figure 7A:
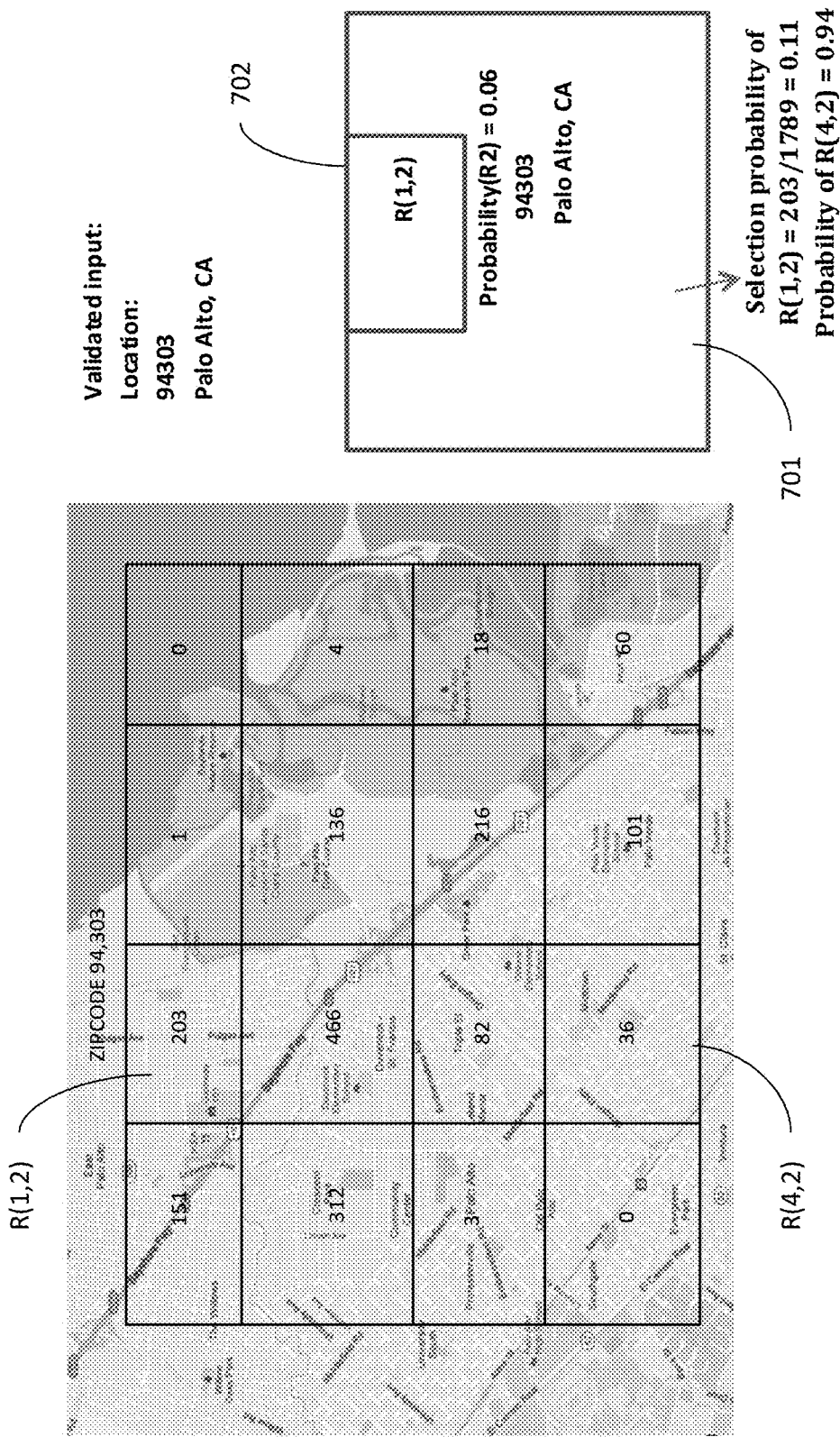
FIGS. 7A and 7B are diagrams illustrating allocation of the probability of the ZC region among the smaller regions according to an embodiment of the present disclosure.

When a request comes with just a ZC (or CS) (or given LL, IP are invalid and ignored), then we are left with just one large ZC (or CS) region. In this case, as shown in FIG. 7A, another smaller region 702 is created in addition to the larger region 701, and the probability of the larger region 701 is distributed between the larger region 701 and the smaller region 702. This can be done in 2 steps:

1. Select a smaller region from among the smaller regions of ZC according to weights distribution. For example, the second smaller region in the last row R(4, 2) can be selected with a probability of 0.02 (36/1789).
2. Distribute the probability of the larger region (in this case probability 1) between R(4,2) and R itself inversely proportional to their sizes. So, Probability of R(4,2), (assuming R(4,2) indeed is the selected smaller region), can be 0.02 (($\frac{1}{16}$)/(($\frac{1}{16}$)+1/1))), as illustrated in FIG. 7A.

Figure 7B:
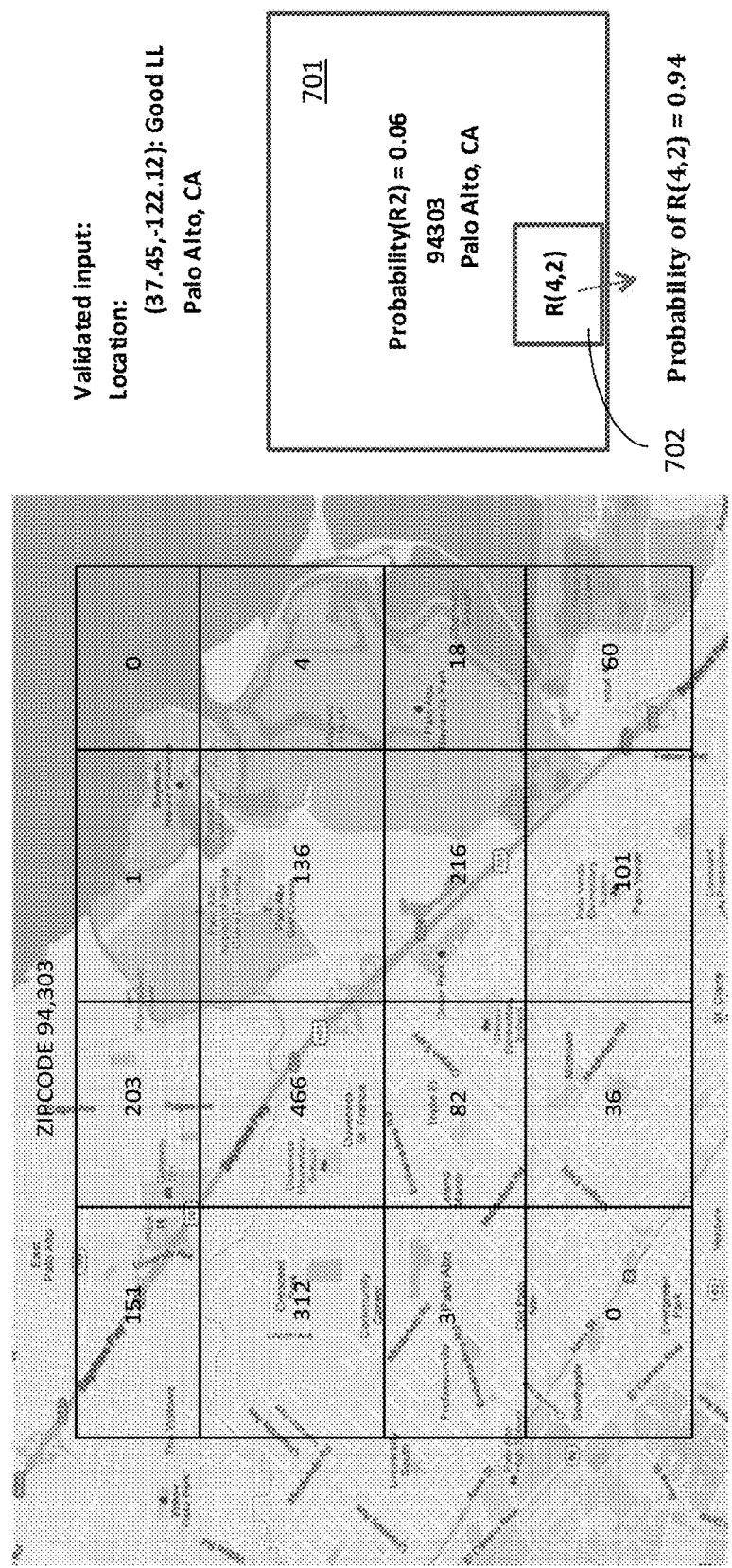

Case 4: Embedded Region—good LL—Smaller Regions: When a good LL comes as part of a request that belongs to a specific ZC/CS large region, as shown in FIG. 7B, a small region can be created around that given LL itself. The probability associated with the large region is then divided between the large region and smaller region by using a rule that gives more weight to smaller region, and some small weight to the surrounding larger region. This division is done similarly to what is done in the second step of Case 3 above—i.e, divide the probabilities inversely proportional to their sizes, as illustrated in FIG. 7B.

In one embodiment, the different phased in the smart location method 200 are carried out using a set of procedures, including one or more validation procedures, one or more context analysis procedures, one or more group creation procedures, a region creation procedure, a probability allocation procedure, and/or one or more smaller region creation and probability allocation procedures, which are discussed in further detail below. In one embodiment, uncertain data are dealt with in several distinct phases, such as:
1. Validate the given location input
   1. Whether individual non-null LL, ZC, CS is valid by itself (Validation Procedure 1)
   2. Whether LL is a bad LL or a good LL (Validation Procedure 2); bad LLs are discarded
2. Analyze the given context—Analyze whether the given context (a combination of one or more of a timestamp, a UID, an IP) has been associated with a more specific set of weights distribution—if not, use a more general set of weights distribution corresponding to No Context (Context Analysis Procedures)
3. Convert the given location input into one or more consistent groups of location inputs—each having a consistent subset of location input (Group Creation Procedures)
4. For each group, $G_i$, obtained above, obtain a corresponding larger region
5. For each group, $G_i$, obtained above, allocate probabilities (Probability Allocation Procedure) based on weights of larger regions obtained
6. For each region of group, $G_i$, obtained above, create a smaller region optionally (Region Creation Procedures)

1. A small region created within the larger region
2. For good LLs, they are created based on sizes of regions
3. For no LLs, or bad LLs, they are created based on weights distribution In one embodiment, a first validation procedure is used to determine the validity of individual components of a location input. This procedure takes care of individual components by themselves. If a component of location input is invalid, then it is simply discarded. ZC, CS, LL to ZC mapping, and IP to Geo info mapping data sources can be used during this procedure.

In one embodiment, a second validation procedure is used to categorize a given LL as good or bad. For example, if the LL corresponds to a centroid of a ZC, or CS, or one of the fixed points of a mapping data source such as IP to geo conversion, it is considered as a bad LL. Otherwise, it is a good LL.

Sometimes, what comes as real LL from an application actually corresponds to ZC/CS centroids (within 5 decimal digit accuracy), or one of few such locations. Hence once it is determined to match one of these "fixed" locations, it is considered as a bad LL, and discarded. ZC and CS centroid data is used as a cache to verify this.

IP to geo conversion data sources are analyzed to figure out whether or not the LLs obtained correspond to a few such coarse LLs (within 5 decimal digit accuracy). If they do, this conversion data is marked as giving bad LLs and these LLs are discarded when IP to geo conversion is made.

There is a third case where some publishers may use a similar geo mapping data source to obtain an LL and pass it. These may not match the centroids. An online version of this procedure can be implemented where the LLs from publishers are added to a cache (keeping 5 decimal digits), and if the ratio of number of LLs in the cache to the number of requests with LLs is very small, then it is concluded that this publisher sends bad LLs. While offline analysis on publisher basis can reveal such publishers, online implementation is both simple and can deal with newly added publishers faster.

In the context analysis procedures of certain embodiments, multiple regions are created when a publisher sends inconsistent location data. One way of obtaining weights for each region is based on default weights distribution. A number of requests within the regions are considered here as weights (although any of other metrics such as the impressions, clicks or CTR, or a combination of these could also be used). Denoting this case as having No Context (NC), the Weight (W) for each region, R, is given as:

$$W_{NC,R} = \sum_C \text{requests}_{C,R}$$

where C represents an arbitrary context, so essentially, all possible contexts, or all requests, are summed over for each region separately. Similarly, given some context C, the weights for each region, R, can be computed as:

$$W_{C,R} = \text{requests}_{C,R}$$

where the requests correspond to that context alone. Sometimes, the context may be helpful in obtaining more reliable location information, and in such cases, the second formula is used. Otherwise, the NC formula can be used as default. A cache of $C \rightarrow \{W_{C,R}\}$ is derived from historical analysis and used at serving time. Given a context at serving time, this cache is used to retrieve the set of $\{W_{C,R}\}$ and, when the specific regions involved become known subsequently, the specific $W_{C,R}$ can be retrieved.

In some embodiments, the second formula may be better to use for certain context types, such as Context Types 1-4 discussed below.

In Context Type 1, some publishers pass the user identification (UID) since they are permitted to do so as part of their application. If a publisher, $\text{Pub}_1$, is known to send actual UIDs, it represents a case where $(\text{Pub}_1, \text{UID}_k)$ can be taken as a context in obtaining the weights using the second formula.

In Context Type 2, a publisher sends only user registration based ZC, and possibly nothing else. Since this typically represents a user's home ZC, it can be relied on more during night time. During the day time, the IP can be relied on to get an approximate location. Basically, both user registered ZC and IP converted location are not always correct about a user's current location. Yet, the less reliable region is kept also but with a lower probability. Hence, the context weights rule discussed above is still applicable in this case where context can be implemented in one of two ways:

1. Context consists of the publisher, UID and timestamp: $(\text{Pub}_1, \text{UID}_k, \text{TS}_k)$
2. Context consists of the publisher, ZC Type (User Zipcode/Other Zipcodes) and timestamp: $(\text{Pub}_1, \text{ZCT}, \text{TS}_k)$ The second option is at a higher level of granularity and can be more useful when the first option suffers from lack of insufficient data for training.

In Context Type 3, some publishers have enough requests from them to track weights separately for them. This is very likely to be more effective than aggregated weights from all publishers since the uncertainty is partly owing to a publisher's app and the way they handle location input. In this case, the context is simply $(\text{Pub}_1)$.

In Context Type 4, as a consequence of IP allocation methods used by carriers, it is possible that a user can be assigned an IP that he keeps as he moves from one location to another. Assuming the user follows typical daily patterns of use, it is possible to think that this IP can have few specific LLs associated with it over a relative short period of time (e.g., a few days) before it is possibly reallocated to someone else. If it is allocated to other users over this period, then the number of locations associated with this IP over the same period can be higher and can fall through a preset threshold. If the associated LL represents one of the central locations owing to IP to geo conversion database's accuracy, those LLs can be removed from consideration even though they are below the threshold (special case).

In the end, some surviving IPs are resolved to represent proxies of user identities (called $\text{PUID}_{IP}$) below. These are short-lived mappings based on previous few days of observation, and are applicable for a relatively short future time period. Each of the IPs can have a few LLs associated with it (that could be mapped to small regions around these LLs). The probability of each of these LLs also could be pre-computed based on the number of requests within those small regions around those LLs.

At serving time, if an IP (context in this case) matches one of these special IPs, representing proxy UIDs (PUIDs), then associated regions can serve as potential regions with associated probabilities.

For example, let Region Set of given IP, $RS_{IP}$ be:

$$RS_{IP} = \left\{ R, \; p_R \middle| \begin{array}{l} R \text{ is a small region around given } LL \text{ of request with given } IP, \\ \text{and } p_R \text{ is the probability of } IP \text{ occuring with } R \end{array} \right\}$$

where small region around an LL is created according to Region Creation Procedure 2. Then, $PUID_{IP}$ is defined as:

$$PUID_{IP} = \left\{ RS_{IP} \middle| \begin{array}{l} LL \text{ of } RS_{IP} \text{ is not a central location,} \\ \text{and } |RS_{IP}| < K \text{ for some constant } K \end{array} \right\}$$

There can be an order of importance of different context types. Given a context, it can match multiple sets of weights since it matches multiple context types. For example, given a publisher and UID, both Context Type 1 and Context Type 3 can be matched. In one embodiment, the type with most components is taken. When the same number of components (but different components) matches, an explicit order among those is forced. Context Type 4 is an exception, and is always used when applicable along with one of the other types. So, for Context Type 4, two matching set of weights can be retrieved.

When context is used to retrieve a set of $\{W_{C,R}\}$ it is possible that a region may not exist for the location input obtained. In such cases, $\{W_{NC,R}\}$ can be used as default weights.

Once the location input components are individually validated, and invalid components discarded, what remain are all valid on their own. However, it is still possible that they may be inconsistent among themselves. For example, when ZC and CS are given, and the ZC is not associated with the given CS, there is no basis to prefer one to another without any historical analysis. The aim of the group creation procedures is to separate the inconsistent location input into multiple groups that contain consistent components within each group separately. The probability allocation procedure can subsequently allocate probabilities to these groups appropriately based on prior historical analysis.

The following procedure can be used to split inconsistent location input to obtain multiple groups (location components have suffix IP or LI (Location Input)):
1. If IP is given, use IP to geo conversion to get ($CS_{IP}$, $ZC_{IP}$, $LL_{IP}$);
    1. If $LL_{IP}$ is a bad LL, discard it (Validation Procedure 2);
    2. If ($CS_{IP}$, $ZC_{IP}$, $LL_{IP}$)=($CS_{LI}$, $ZC_{LI}$, $LL_{LI}$) then do nothing since IP is not contributing anymore than other input available;
        1. Null component comparison always succeeds;
    3. Else if ($CS_{IP}$, $ZC_{IP}$)=($CS_{LI}$, $ZC_{LI}$) then associate IP with this ZC group;
    4. Else if $CS_{IP}$=$CS_{LI}$, then associate IP with CS;
    5. Else create one group with (IP, $C\square_{IP}$, $ZC_{IP}$, $LL_{IP}$); label it as IP Group;
2. If ZC is not in a given CS, then create two different groups—one for ZC (and its derived CS), and another for CS;
    1. If (ZC=$ZC_{IP}$) put IP with ZC group;
    2. If (CS=$ZC_{IP}$) put IP with CS group;
3. If a good LL is present, use LL to geo map to get corresponding ZCs and/or CSs (note that more than one ZC boundary could match this LL);
    1. If any of ZCs match with the group with ZC, then associate LL with that ZC with the group with ZC;
    2. Else any of if CSs match with the group with CS, then associate LL with that CS with the group with CS;
    3. Else create a new group with LL and its derived ZC and/or CS; and/or
    4. If an $LL_{IP}$ is with ZC/CS group, this LL can replace it.

Note that if all components of location input are consistent, only one group may need to be created.

In the region creation procedure, the set of $\{W_{C,R}\}$ data, which is obtained during context analysis to determine the associated large ZC/CS level region along with its weight, is used for each group. These regions should already have associated weights obtained through background processing of historical data. Each region can also have an associated set of small regions with their own weights.

In case of IP Groups, the associated $\{W_{C,R}\}$ may also represent a set of regions to have in the smart location method with those weights. In this case, multiple large regions can be created, one per region in this set. Also note that each of these regions can have a specific LL that can lead to a small region around it as described later on.

In the probability allocation procedure, weights distribution is used to allocate probabilities to different regions. They are computed as follows:

$$Prob(G_i | C) = \frac{W_{C,G_i}}{\sum_{G_k} W_{C,G_k}}$$

where $G_k$ varies over all groups of that request and $W_{G_i}$ is the weight of the region associated with the group $G_i$ under context C, which can also be NC. In case IP Group is one of the groups, the maximum weight is used in this formula, somewhat arbitrarily.

For non-IP groups, the probability of the associated region is the same as that of its group:

$Prob(R_i|C)=Prob(G_i|C)$

For IP Groups, the obtained probability by using the above formula is distributed among the regions it contains according to its own weight distribution (recall that in this special case, two weight distributions would have been retrieved):

$$Prob(R_i | C) = \frac{W_{C,R_i}}{\sum_{R_k} W_{C,R_k}} = Prob(G_i | C)$$

where i now varies over all regions of IP group, and the weights are associated with those regions.

So far, only large regions are created, and they correspond to consistent subset of original location input. Some of these may have LLs, and if they do, they are good LLs. In such cases, one or more smaller region creation and probability allocation procedures of some embodiments are used to create a small region around the given LL as it is more representative of where the user is. The larger surrounding region is kept with a lower probability of where the user is to account for the uncertainty with the given LL.

In one embodiment, a small or smaller region is a region within a ZC region or a CS region. One simple way of dividing a ZC region into such smaller regions is by looking only at the first 3 (or 4 or 5) digits of lat/longs (for example, (30.000, −122.122) and (30.001, −122.123) may correspond to two opposite corners of a rectangular smaller region obtained by keeping 3 decimal digits).

In one embodiment, this can be done by: a) taking the bounding rectangle of a ZC (or CS), and expanding outward until the corner LLs have 0 in decimal places beyond 3 (or 4 or 5 depending on different implementations), and b) dividing this into a grid of width proportional to 3rd (or 4th or 5th) decimal accuracy. Along the boundaries, the region could cross ZCs, but it shouldn't matter at all.

By keeping each request's first N decimal digits and obtaining the weights (requests) distributions, the distribution can be smoothed to a desired extent. The number of decimal digits to keep in this function can vary from one ZC/CS region to another depending on the total number of requests in that region. This allows for regions that are highly dense to keep more digits (smaller grid) because requests are likely to occur in a statistically significant manner within each smaller region of the grid. The number of digits of accuracy used for a region is determined in the background process while building the weights distribution, and is associated with it.

For each large region, $R_i$, with good LL, an additional small region can be created. For example, $N_{R_i}$ tells us how many decimal digit accuracy is used, and how many small regions, $R_i$, are present. Hence, the give good LL can be truncated to this accuracy to obtain the lower corner of the smaller region, $R_{i_{LL}}$, into which it falls. The upper corner of the small region can be obtained simply by incrementing the lowest decimal digit of both latitude and longitude. The probability, $Prob(R_i|C)$, can now be split between these two, which are inversely proportional to the size of the regions so that the smaller region gets more of the probability and the larger one gets the remainder such that an area around the given LL is more relied up than the surrounding area, i.e.:

$$Prob(R_{i_{ZCorCS}} | C) = \frac{1}{N_{R_i} + 1}$$

$$Prob(R_{i_{LL}} | C) = \frac{N_{R_i}}{N_{R_i} + 1}$$

where $R_{i_{ZCorCS}}$ is the original large region at ZC or CS level.

In one embodiment, one or more allocation procedures are used to create a small region within a given ZC (or CS) region. When a given LL is a bad LL, or it is not given at all, businesses within that entire ZC (or CS) are equally likely no matter what the distribution of users/requests within that ZC is. This is a crude approximation and has a potential to match a same set of businesses. More reliable LL requests from search and display data can be analyzed to arrive at the spatial request distributions offline, and used to allocate incoming requests at a more granular level to different smaller regions within that ZC/CS. This approach is intuitively more appealing to achieve a reasonable distribution of requests among businesses, and hence improve overall metrics. This is achieved by creating a grid (as indicated earlier) with given decimal digit accuracy, by mapping requests to these grids, and then by developing a request distribution over the smaller regions of this grid.

In one embodiment, each ZC and CS is regarded as a region with a bounding rectangle where a separate spatial discrete probability distribution is generated with the LL as a discrete random variable, as follows:

$$P(\text{region}) = \sum_u Pr(X = u) = 1$$

where u runs over all values of X, i.e., all LLs in that region are converted to a given decimal digit accuracy, and $$Pr(X = u) = \frac{\text{Requests}(X = u)}{\sum_u \text{Requests}(X = u)}$$

where Requests are both search and display requests. Each u represents a small region. When an incoming request needs an allocation after validation procedures are applied, the above distribution can be used to pick a u.

Once a request with bad LL is allocated to a region, u, with probability distribution computed as above, a unique $LL_u$ can be generated within that region and a confidence factor can be associated therewith. For example, the unique $LL_u$ can be generated within this region using a uniform distribution, and a confidence factor (CF) can be associated therewith as $$CF(X = LL_u) = K * \frac{Pr(X = u)}{A_u}$$

where $A_u$ is an area of the smaller region, u, and K is a constant used for normalization across varying sites of small regions. K can be determined experimentally. The confidence factors generated as above can be adjusted to suit many practical considerations by choosing an appropriate value for the constant K. Any of various standard boosting techniques known in the industry could be used to pick a K.

The function defined as above can be extended to include additional attributes in addition to LL for the random variable. For example, the height of the location can be used to make it a 3-dimensional space, and additional contextual attributes mentioned earlier can be added to make it a multi-dimensional space. The allocation procedure can remain the same within these different dimensional spaces.

Figure 8:
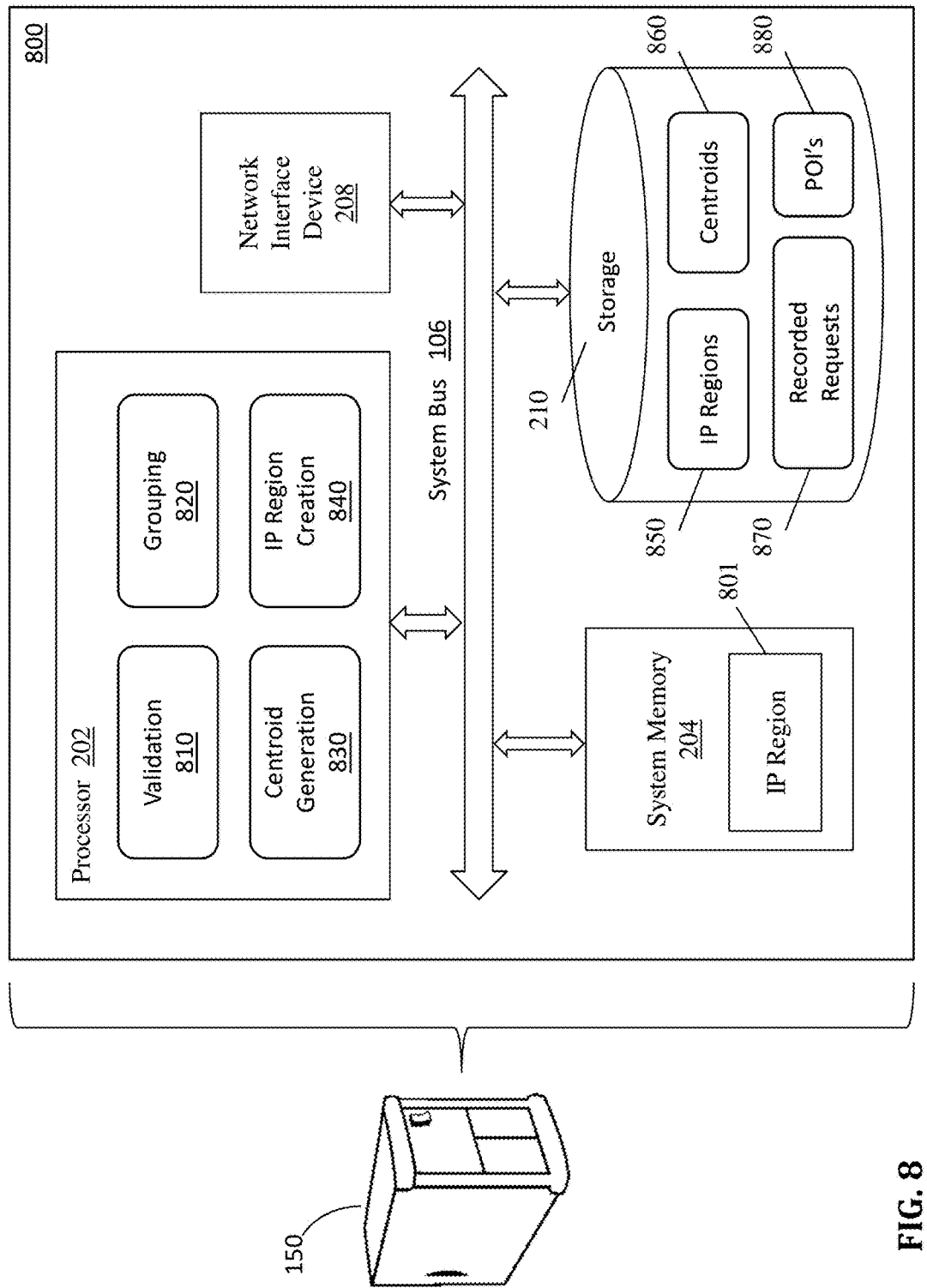
FIG. 8 is a diagrammatic representation of an IP region system according to certain embodiments.

FIG. 8 is a diagrammatic representation of an IP region system 800 provided by a computer/server system 150 according to certain embodiments. As discussed above, an IP region can be used as probable locations to select from when a request comes with an IP address but without accurate geographical coordinates. The IP region system 800 derives IP regions corresponding to respective IP addresses using ad requests including the respective IP addresses that have been received over a period of time (e.g., a few days). As shown in FIG. 8, the processor 202 in the computer/server system 150, when executing an IP region software program 801 loaded in the main memory 204, provides the IP region system 800 including a validation module 810, a grouping module 820, a centroid generation module 830, and a IP region creation module 840. The system 800 makes use of a plurality databases storing data used and/or generated by the IP region software program 801, including a database 850 for storing IP regions generated by the IP region creation module 840, a database 860 storing the centroids generated by the centroid generation module 830, a database 870 for storing received ad requests, and a database 880 for storing a Point of Interest (POI) directory. Any or all of these databases can be located in the storage 210, or in another server/computer 120 and/or NAS 121 in the network 100, which the process 202 can access via the network interface device 208.

Figure 9:
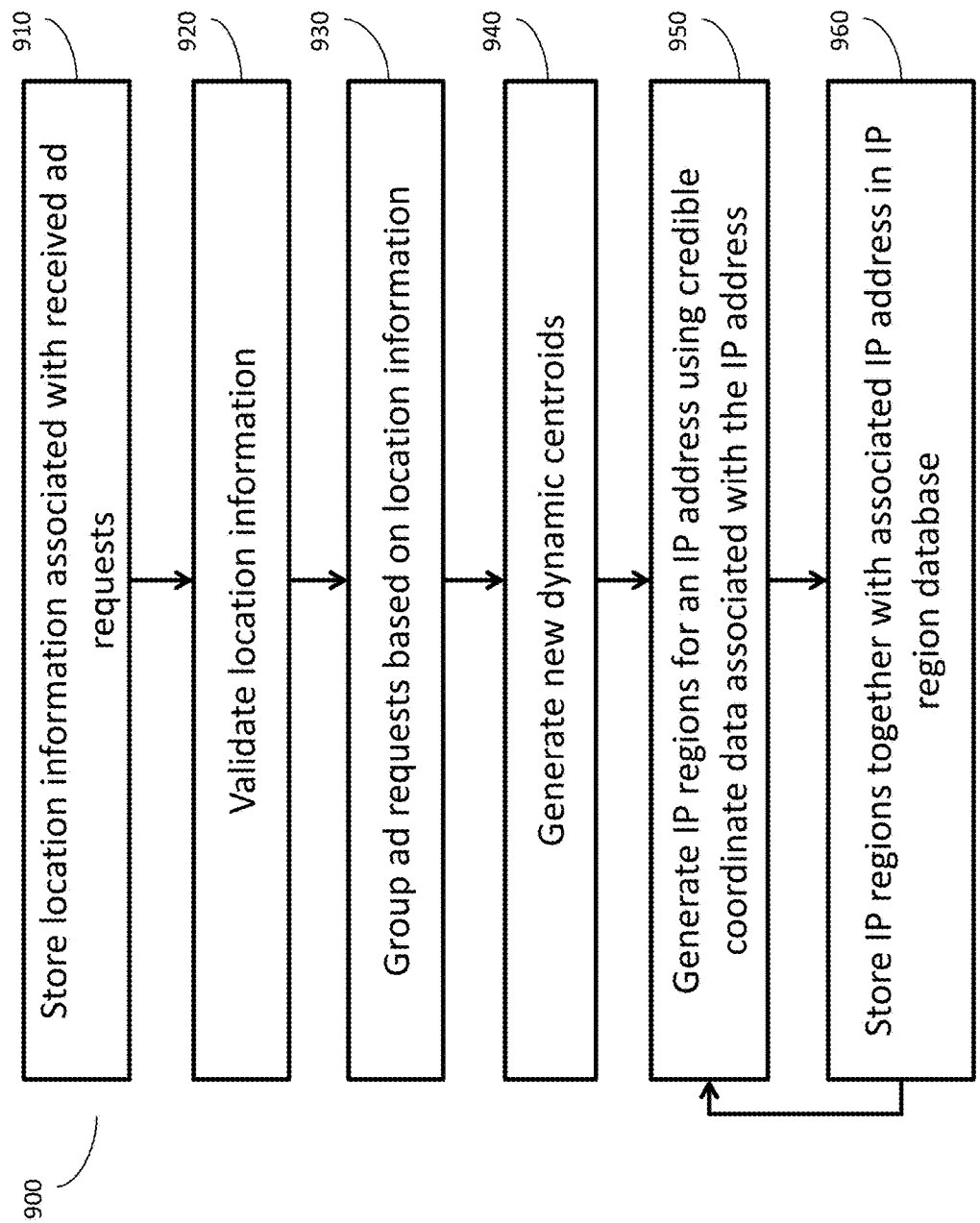
FIG. 9 is a flowchart illustrating a method performed by the IP region system to derive IP regions for respective IP addresses according to certain embodiments.

FIG. 9 is a flowchart illustrating a method 900 performed by the IP region system 800 to derive IP regions for respective IP addresses according to certain embodiments. As shown in FIG. 9, when ad requests traffic come in, the IP region system stores (910) at least the location information of the ad requests in the database 850. After a certain period of time (e.g., a few days), the IP region system 800 performs the method 900 to derive IP regions from the stored location information. The validation module 810 examines (920) the LLs in the stored location information to determine whether each set of LL is a true LL (i.e., representing actual mobile device location).

In certain embodiments LLs derived from IP addresses are not used as locations of the associated mobile devices. They can still be used, however, to derive additional location components. In certain embodiments, a lower confidence factor is associated with non-GPS-based LLs and their accuracies are thus downgraded through validation, For example, if a LL matches a spatial zip centroid, the LL is downgraded to its enclosing zip as though that zip came in the request as a location component instead of the LL. Such downgrading can happen from LL to IP, LL to ZC, ZC to CS, etc. Historical data is processed to come up with centroids to help in the above rejection/downgrading process used in the validation module.

Based on the determination, the grouping module 820 groups (930) the requests or their respective location components into different traffic groups, such as the following:

1. T(IP, TLL)—Each request in this group has an IP and also a valid geo-precise LL;
2. T(IP, DLL_Static)—Each request in this group has an IP and a derived set of LL that correspond to a static centroid, i.e., a centroid derived from geographic mapping (e.g., a city center) or IP vendor mapping;
3. T(IP, DLL_Dynamic)—Each request in this group has an IP and a derived LL that is not a static centroid;
4. T(NoIP, TLL)—Each request in this group has a valid geo-precise LL but no IP;
5. T(NoIP, DLL_Static)—Each request in this group has a derived LL corresponding to a static centroid but no IP;
6. T(NoIP, DLL_Dynamic)—Each request in this group has a derived LL that is not a static centroid;
7. T(IP, NoLL)—Each request in this group has an IP but no LL.

In certain embodiments, the grouping module 820 puts location information into the T(IP, DLL_Static) group if the location information has an IP address and the LL in the location information corresponds with LL of a static centroid stored in the centroid database. In certain embodiments, static centroids associated with well-know geographic regions such as cities, regions associated with zip codes, etc. are stored in the centroid database. If the LL of a request correspond to one of the static centroids, it is highly likely that this LL is not a true LL but an LL mobile publishers put together by referring to the city of the mobile user.

In certain embodiments, the grouping module 820 puts location information into the T(IP, DLL_Dynamic) group if the location information has an IP address and the LL in the location information does not correspond with any of the static centroids in the centroid database but corresponds with the LL of a dynamic centroid (i.e., a centroid that occurs with this IP address very frequently or above a threshold in a given period—indicating another IP vendor's database being used by a publisher to derive the LL from an IP, while not being covered by known static IP centroids).

In certain embodiments, the grouping module 820 puts location information into the T(NoIP, DLL_Static) group if the location information does not have an IP address and the LL in the location information corresponds with LL of a static centroid stored in the centroid database. In certain embodiments, static centroids associated with well-know geographic regions such as cities, regions associated with zip codes, etc. are stored in the centroid database. If the LL of a request correspond to one of the static centroids, it is highly likely that this LL is not a true LL but an LL mobile publishers put together by deriving from an IP address.

In certain embodiments, the grouping module 820 puts location information into the T(NoIP, DLL_Dynamic) group if the location information does not have an IP address and the LL in the location information does not correspond with any of the static centroids in the centroid database but corresponds with the LL of a dynamic centroid (i.e., i.e., a centroid that occurs with this IP address very frequently or above a threshold in a given period—indicating another IP vendor's database being used by a publisher to derive the LL from an IP, while not being covered by known static IP centroids).

In certain embodiments, the grouping module 820 puts location information into the T(IP, TLL) group if the location information has an IP address and the LL in the location information does not correspond with any of the static centroids in the centroid database, or any of the dynamic centroids in the dynamic centroid database 860. Likewise, the grouping module 820 put location information into the T(NoIP, TLL) group if the location information has no IP address and the LL in the location information does not correspond with any of the static centroids in the centroid database, or any of the dynamic centroids in the dynamic centroid database 860.

In certain embodiments, the centroid module 820 determines whether any of the location information in the T(IP, TLL) group actually includes derived LLs even though these LLs are not found in the dynamic centroid database 860 or IP region database 850, and creates (940) a new dynamic centroids corresponding to these possibly derived LLs. For example, if a first number of requests made in a certain amount of time with the same IP and the same LL (or LLs in very close range with each other) is unusually large, it is likely that this same LL or closely spaced LLs are actually derived LLs for the IP address because these many mobile users are unlikely to be at the same spot in such a short period of time. The centroid module 820 may check the POI database to see if the IP address is associated with a POI, which would host many mobile users. If not, the centroid module 820 may use these LLs to derive (940) a dynamic centroid and store this LL together with the IP address in the dynamic centroid database 860. The IP region system 800 may also take the first number of requests with this IP address and the same LL (or closely spaced LLs) out of the T(IP, TLL) group and put them into the T(IP, DLL_Dynamic) group.

As another example, if a second number of requests made in a certain amount of time with no IP and with a same LL (or closely spaced LLs) is unusually large, it is likely that this same LL (or closely spaced LLs) is actually a derived LL because these many mobile users are unlikely to be at the same LL in such short period of time. The centroid module 820 may regard this LL (or closely spaced LLs) as a dynamic centroid and store this LL in the dynamic centroid database 860. The grouping module 810 may also take the second number of requests with no IP address and with the same LL (or closely spaced LLs) out of the T(NoIP, TLL) group and put them into the T(NoIP, DLL_Dynamic) group.

Figure 10:
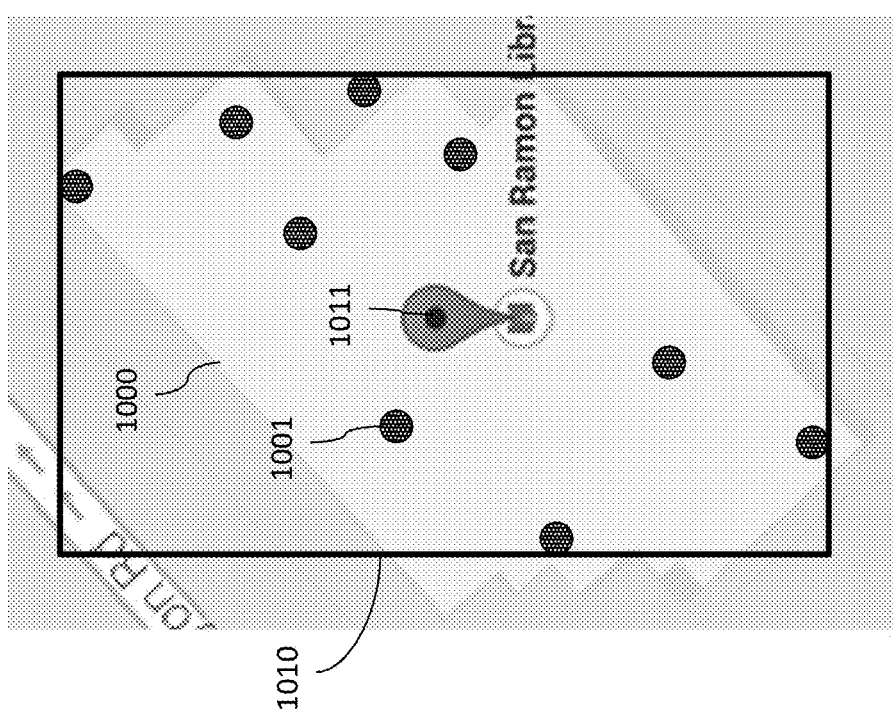
FIG. 10 is a diagram illustrating an exemplary IP region created using location information from multiple ad requests according to certain embodiments.

For each respective IP address in the surviving T(IP, TLL) group, the IP region creation module 840 generates (950) an IP region using the TLLs associated with this IP address in the T(IP, TLL) group. For example, as shown in FIG. 10, the TLLs 1001 associated with the IP address of a WiFi device at an establishment 1000 (e.g., a city library) are used to derive an IP region 1010, which is a polygon (e.g., rectangle) with a center location 1011 being a centroid derived from the TLLs 1001 and a size that is determined by the span of the TLLs in the T(IP, TLL) group. The IP region can be represented by a set of points, such as:

IP Region=$(P_1, P_2, \ldots, P_m)$ where a point, $P_m$, is given by $P_m$=(Latitude$_m$,Longitude$_m$)

The center location 1011 is also stored as the centroid associated with the IP region 1010. By representing a region as a set of points, the resolution of a region can be set to arbitrary levels depending on the number of points. For example, a region with three points can be used to encode a triangular-shaped region, four points a rectangular-shaped region, etc.

Thus, IP regions are generated from ad requests that include IP addresses together with GPS-based LLs. Dynamic LL centroids and Dynamic IP centroids are some of the mechanisms to figure out bad LLs to weed them out, and thus not use in IPregion construction. In certain embodiments, certain true LLs are not used to derive dynamic LL centroids. For example, if an LL occurs only during day time, but not during night time, at a certain frequency, it is not considered for dynamic LL centroid derivation, since this could be a valid POI like library where the router's LL is being obtained. However, if an LL occurs above a certain frequency during night time when real users are unlikely to be present, it is assumed that it is derived LL and qualifies for use dynamic LL centroid derivation.

Figure 11:
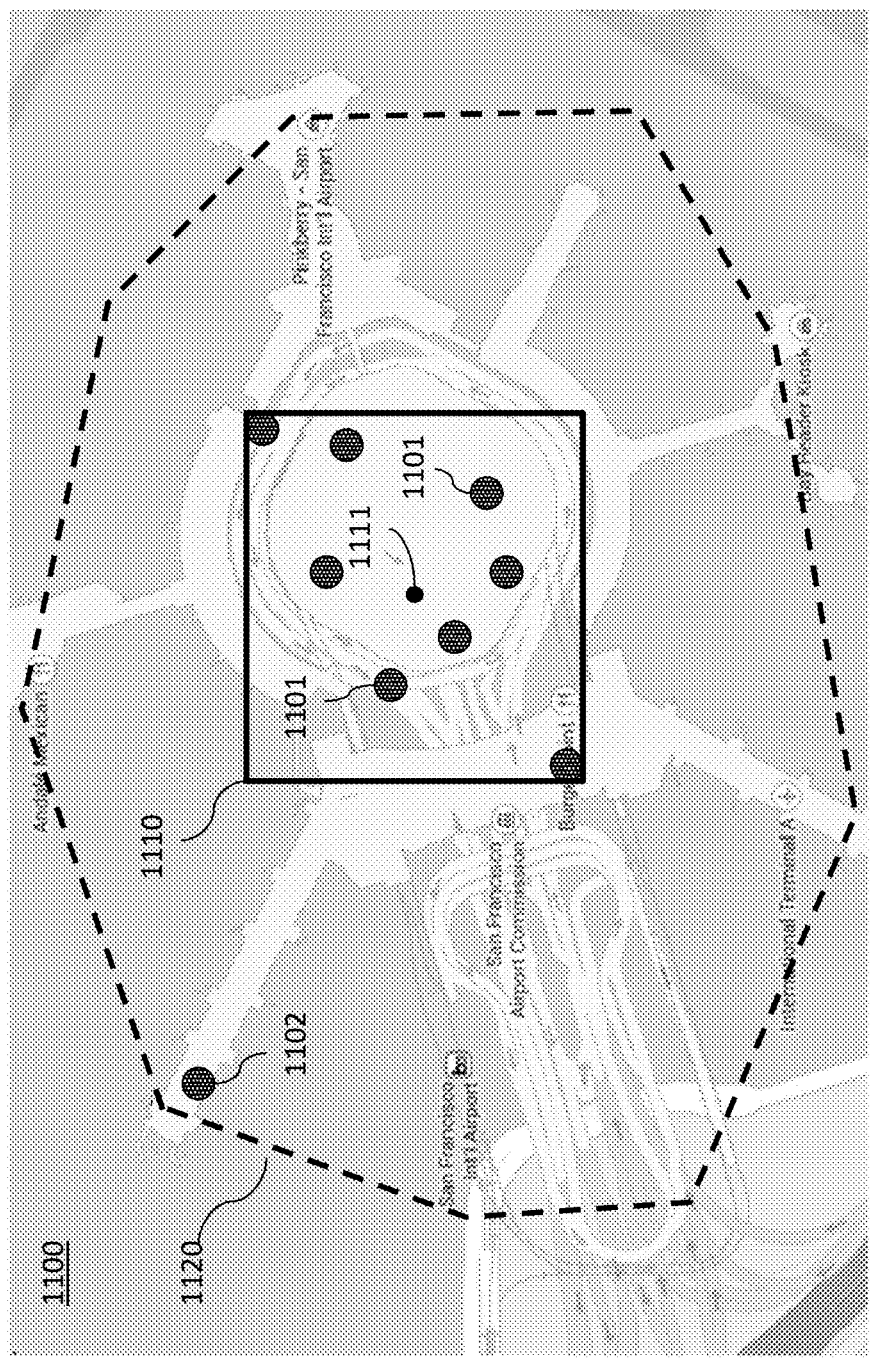
FIG. 11 is a diagram illustrating an exemplary IP region for a large establishment such as an airport according to certain embodiments.

In certain embodiments, as shown in FIG. 11, when an establishment is large, such as an airport 1100, the IP region 1110 derived from the TLLs 1101 with centroid 1111 may not represent the full span of the establishment linked to the first IP address because the TLLs obtained are either concentrated in a small area, or another outlier TLL 1102 is weeded out when deriving the centroid 1111 and the IP region 1110. Thus, the IP region engine would consult the POI database, to see if the calculated IP region is smaller than the POI region stored in the POI database, and if so, the POI region will be stored as the IP region for the IP address in the IP region database.

In certain other embodiments, an IP region could be as large as a zip code when the associated IP address corresponds to a cellular IP address for a cellular tower. Hence, IP ranges could be as small as less than 50 meters, to as large as covering a wide area.

The IP region system 800 stores the IP regions generated by the IP region creation module 840 in the database 850. FIG. 12 illustrates a few examples of IP regions stored in the database 850 as spatial indices together with the associated IP addresses and other information such as their respective centroids, etc. When an ad request comes in including an IP address but without true LL, the IP regions database 850 is queried with the IP address, and if a match is found, the centroid of the IP region can be used as an estimated location for the ad request, or the entire IP region can be used as a probable region of the mobile device associated with the ad request.

Figure 13:
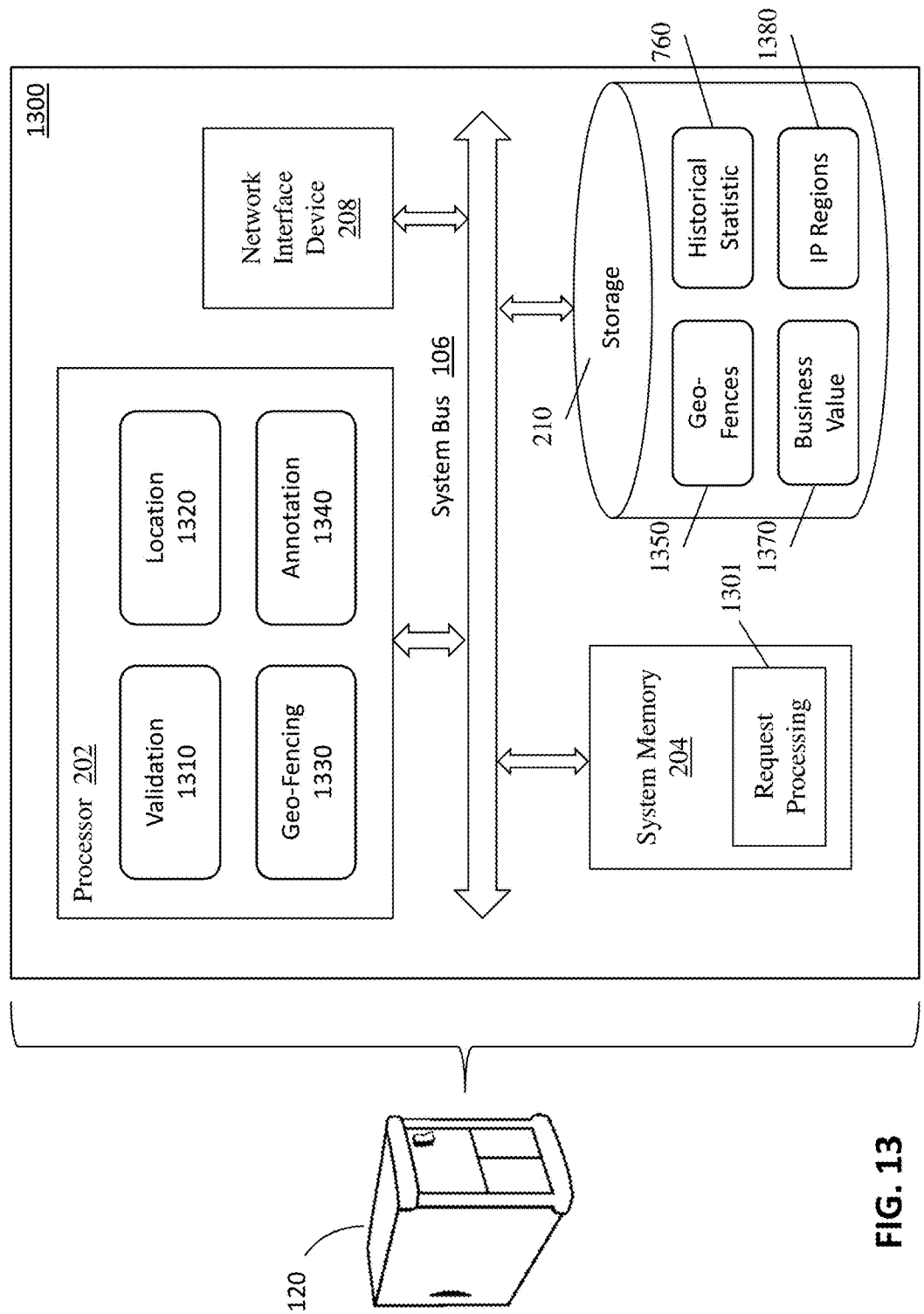
FIG. 13 is a diagrammatic representation of an ad request processing system according to certain embodiments.

FIG. 13 is a diagrammatic representation of a request processing system 1300 provided by a computer/server system 150 that processes mobile ad requests received from the network 100 according to certain embodiments. As shown in FIG. 13, the processor 202 in the computer/server system 150, when executing an ad request processing software program 1301 loaded in the main memory 204, provides the request processing system 1300 including a validation module 1310, and a location module 1320. The system 1300 may further include a geo-fencing module 1330, and an annotation module 1340, such as those described in commonly owned U.S. Patent Application entitled "Systems and Methods for Marketing Mobile Advertising Supplies," filed on even date herewith, which is incorporated herein by reference in its entirety. The system 1300 makes use of a plurality databases storing data used and/or generated by the request processing software program 1301, including a database 1350 for storing the geo-fences generated by the geo-fence definition system 300, a database 1360 for storing historical/statistical data, a database 1370 for storing business value information, and a database 1380 for storing IP regions corresponding to respective IP addresses of a collection of WiFi hotspots 135 and cellular towers 101*a*. Any or all of these databases can be located in the storage 210, or in another server/computer 120 and/or in a network attached storage (NAS) device (not shown), which the process 202 can access via the network interface device 208.

Figure 14A:
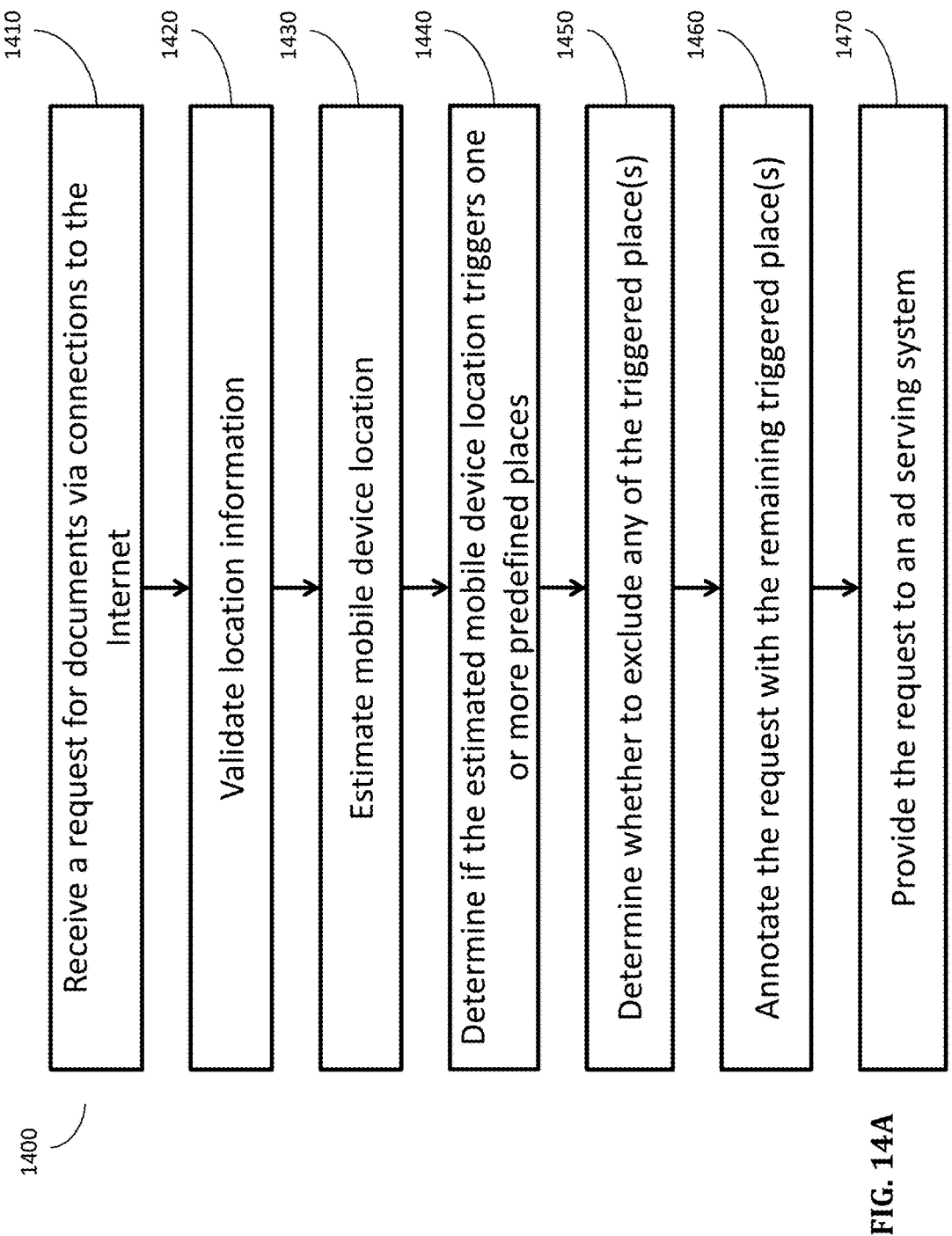
FIG. 14A is a flowchart illustrating a method performed by the ad request processing system according to certain embodiments.

FIG. 14A is a flowchart illustrating a method 1400 performed by the request processing system 1300 according to certain embodiments. As shown in FIG. 14A, the system 1300 receives (1410) an ad request via connections 208, 208*a* to a network (e.g., the Internet). The ad request may come from a mobile publisher or any web service provider, with whom a mobile user has initiated interaction using his/her mobile device 130 via one or more web services or applications provided by the mobile publisher. The ad request may also be initiated by a software development kit (SDK) provided by a supply side platform (SSP). The ad request may also be provided by, for example, an ad middleman, an ad exchange, or any ad service provider. The ad request includes mobile device location information including a plurality of location components, such as latitude and longitude coordinates (LL), IP addresses (IP), postal or zip codes (ZC), and/or city-state names (CS), etc, in addition to other information. The ad request may also include an altitude coordinate, which can be used to indicate an elevated location of the mobile device.

In certain embodiments, the validation module 1310 validates (1420) the location information by checking the validity and consistency of the location components and by weeding out any invalid location component(s). Generally, the LL is usually believed to be the most useful location component. However, when a user doesn't allow his/her location information to be known, mobile applications typically provide only coarse location data in the form of, for example, an IP address, a ZC (e.g. entered by the user at the time of registration), or CS. Thus, mobile applications and publishers frequently provide LLs obtained from geo-coding software, which translates ZC, CS, and other points of interests into one representative LL. In one embodiment, such representative LLs are categorized as "bad LLs". A bad LL can be, for example:

1. A centroid of a ZC/CS
2. Any fixed point on a map (e.g. (0,0) or an arbitrary location)

In certain embodiments, the validation module 1310 weeds out the bad LL's, so that location data with bad LL's are not provided to the next stage processing in the system 1300, as discussed above.

The location module 1320 estimates (1430) the location of the mobile device from the ad request and generates location data to represent an estimated mobile device location, which may be a geographical point or one or more probably areas or regions the mobile device is estimated to be in. The geo-fencing module 1330 queries the geo-fence database 1350 with the location data to determine (1440) whether the location data triggers one or more predefined places in the database 1350. The geo-fencing module 1330 may further determine (1450) whether any of the triggered place(s) should be excluded or discarded, as discussed in further detail below. The annotation module 1340 annotates (1460) the ad request with the triggered place(s). The annotated request is provided to an ad serving system, which can be in the same computer/server system 150 or a different computer/server system 150 in the network 100. The ad serving system can be an ad server, an ad exchange or ad market place. The system 1300 transmits the annotated ad request to the ad serving system over the network 100 if the ad serving system is in a different computer/server system.

Figure 14B:
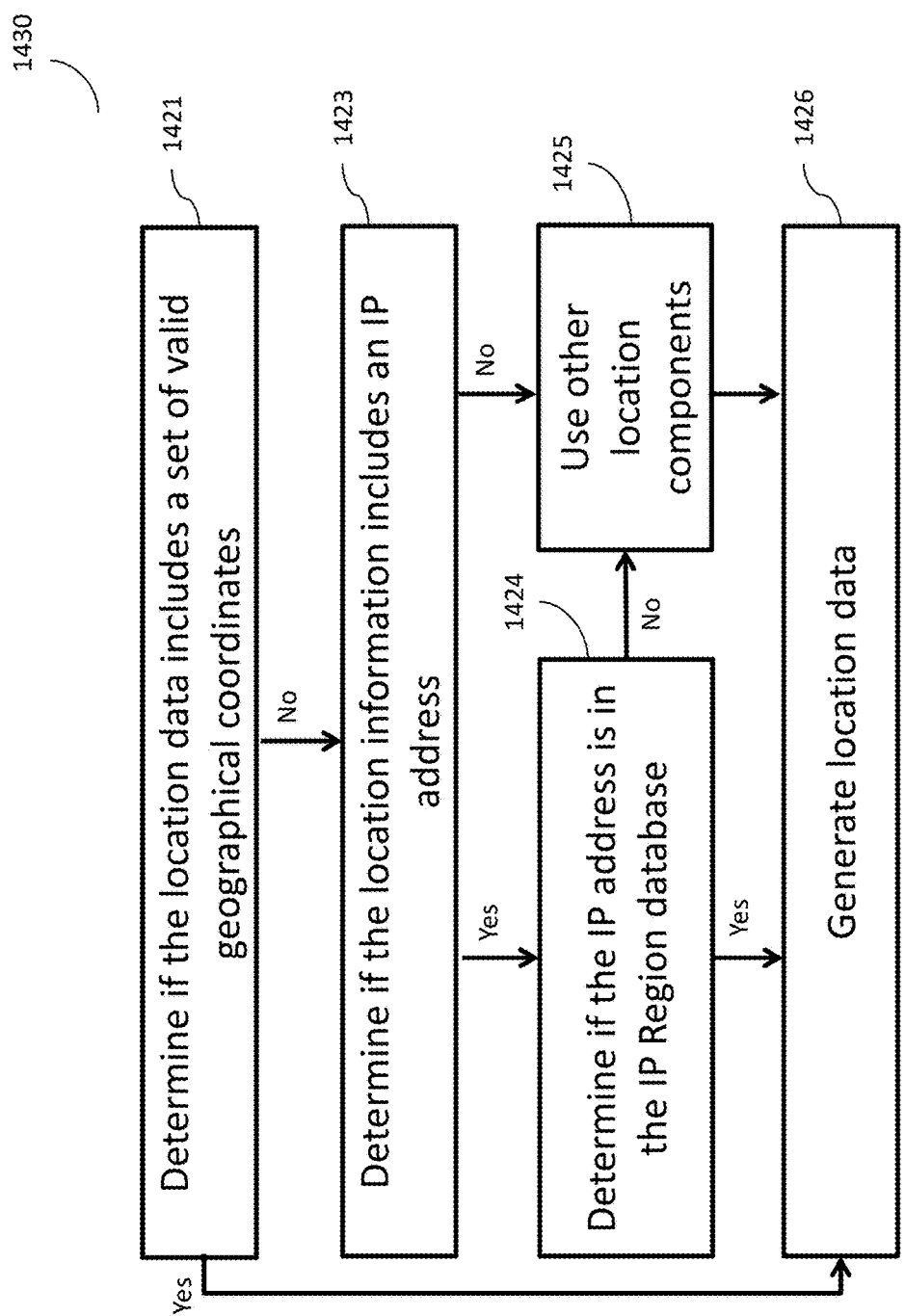
FIG. 14B is a flowchart illustrating a location process to generate location data according to certain embodiments.

FIG. 14B is a flowchart illustrating a location process 1430 performed by the location module 1320 to generate (1430) the location data. As shown in FIG. 14B, the location module determines (1421) whether the validated location components include a set of geographical coordinates (e.g., LL), and whether the set of LL is valid or geo-precise LL. If the set of LL is determined to be valid or geo-precise LL (i.e., true LL), the location module 1320 would use the LL as the location data to represent an estimated mobile device location. On the other hand, if the validated location components do not include a set of LL or the set of LL is not true LL, the location module 1320 determines (1423) whether the validated location components include an IP address. If the validated location components include an IP address, the location module then determines (1424) if the IP address is in the IP region database 1380. If the IP address is in the IP region database 1380, the location module generates (1426) the location data using a derived IP region associated with the IP address in the IP region database 1380. The location data may include geographical points representing the IP region itself or its center location with some function of the inverse of a size of the IP region as a confidence factor. On the other hand, if the location data does not include an IP address or the IP address is not found or associated with a derived IP region in the IP region database, the location engine would use (1425) other location components to generate (1426) location data, or use external IP vendor databases to resolve an IP to other location components first and then use (1425) the other location components to generate (1426) location data. In certain embodiments, the location data generated using the other location components include one or more weighted probable areas, as discussed above.

We claim:

1. A method performed by one or more computer systems coupled to a packet-based network via wired or wireless connections to determine a location of a particular mobile device, the method comprising:

receiving from a plurality of sources in the packet-based network requests associated with a plurality of mobile devices communicating with the packet-based network, each request including location components and context information, the location components including one or more of a set of geographic coordinates, an Internet Protocol (IP) address, a name of a first geographical region, and a code of a second geographical region, the context information including an identification of a mobile device with which the each request is associated, and an identification of a source of the each request;

for each source of the plurality of sources, providing a cache to store the set of geographical coordinates in each received request including an identification of the each source, and determining whether the each source has provided invalid geographical coordinates based on a number of unique sets of geographical coordinates in the cache as compared to a total number of received requests identifying the each source;

deriving a plurality of dynamic centroids from the requests, the plurality of dynamic centroids including at least one of a first centroid and a second centroid, the first centroid being derived from a first subset of the requests received within a first predetermined time duration, each of the first subset of the requests including a same IP address and a set of geographic coordinates in a vicinity of a first geographical location, a number of requests in the first subset of the requests exceeding a first preset threshold, the second centroid being derived from a second subset of the requests received within a second predetermined time duration, each of the second subset of the requests including no IP address and a set of geographic coordinates in a vicinity of a second geographical location, a number of requests in the second subset of the requests exceeding a second preset threshold;

receiving a set of input signals associated with the particular mobile device from the packet-based network, the set of input signals including corresponding location components and corresponding context information, the corresponding context information including one or more of a timestamp, an identification of the particular mobile device, and an identification of a particular source of the set of input signals;

determining whether the corresponding location components include a pair of latitude/longitude coordinates;

in response to the determination that the set of input signals include a certain pair of latitude/longitude coordinates, determining whether the certain pair of latitude/longitude coordinates correspond to one of a plurality of static centroids in a static centroid database, each respective static centroid of the plurality of static centroids being a fixed location associated with one of a city, a town, a county, a state, a country, a postal code, an area code, and an IP address;

in response to the certain pair of latitude/longitude coordinates corresponding to a static centroid in the static centroid database, marking the certain pair of latitude/longitude coordinates as invalid;

determining whether the certain pair of latitude/longitude coordinates correspond to one of the plurality of dynamic centroids;

in response to the certain pair of latitude/longitude coordinates corresponding to a dynamic centroid, marking the certain pair of latitude/longitude coordinates as invalid;

determining whether the particular source of the set of input signals is one of a plurality of sources identified as providing invalid geographical coordinates;

in response to the particular source of the set of input signals being a source that has provided invalid geographical coordinates, marking the pair of latitude/longitude coordinates as invalid;

in response to the pair of latitude/longitude coordinates being marked invalid, deriving the location of the particular mobile device using one or more other location components of the corresponding location components and the corresponding context information included in the set of input signals.

2. The method of claim 1, further comprising:

for each IP address of a plurality of IP addresses, deriving geographical location information for the each IP address using geographic coordinates included in selected requests, each of the selected requests including the each IP address and having a set of geographic coordinates that is not marked as invalid; and storing the geographical location information together with the each IP address in an IP region database accessible by the one or more computer systems.

3. The method of claim 2, wherein the set of input signals further includes a particular IP address, and wherein deriving the location of the particular mobile device comprises searching in the IP region database for the geographical location information for the particular IP address.

4. The method of claim 3, further comprising:

in response to finding the particular IP address in the IP region database, deriving a location for the particular mobile device from the geographical location information for the particular IP address included in the set of input signals.

5. The method of claim 4, further comprising attaching a confidence factor to the location of the particular mobile device based on the geographical location information for the particular IP address included in the set of input signals.

6. The method of claim 5, wherein the geographical location information for the particular IP address includes data defining a particular geographic region and the confidence factor is dependent on a size of the particular geographic region.

7. The method of claim 1, wherein the static centroid is a fixed location in a geographic region selected from the group consisting of: a city, a town, a county, a state, a country, a region associated with a postal code, and a region associated with an area code.

8. The method of claim 7, wherein the fixed location in the geographic region is a geometric centroid of the geographic region.

9. A method performed by one or more computer systems coupled to a packet-based network via wired or wireless connections to determine a location of a particular mobile device, the method comprising:

receiving a set of input signals associated with the particular mobile device from the packet-based network, the set of input signals including a plurality of location components and context information, the context information including one or more of a timestamp, an identification of the particular mobile device, and an identification of a source of the set of input signals;

determining whether the plurality of location components include a pair of latitude/longitude coordinates;

in response to the determination that the set of input signals include a certain pair of latitude/longitude coordinates, determining whether the certain pair of latitude/longitude coordinates correspond to a centroid of a fixed geographical region or a fixed point on a map;

in response to the pair of latitude/longitude coordinates corresponding to the centroid of a certain fixed geographical region or a fixed point on a map, marking the certain pair of latitude/longitude coordinates as invalid;

determining whether the certain pair of latitude/longitude coordinates correspond to a central location associated with an Internet Protocol (IP) address;

in response to the certain pair of latitude/longitude coordinates corresponding to the central location associated with a certain Internet Protocol (IP) address, marking the certain pair of latitude/longitude coordinates as invalid;

determining whether the source of the set of input signals has been identified as providing invalid geographical coordinates;

in response to the source of the set of input signals being a certain source identified as providing invalid geographical coordinates, marking the certain pair of latitude/longitude coordinates as invalid;

in response to the certain pair of latitude/longitude coordinates being marked as invalid, deriving the location of the particular mobile device using one or more other location components of the plurality of location components and the context information.

10. The method of claim 9, further comprising:

receiving requests associated with a plurality of mobile devices communicating with the packet-based network, each respective request including respective location components and respective context information, the respective location components including one or more of a respective set of geographic coordinates, an Internet Protocol (IP) address, a name of a geographical region, and a code of a geographical region, the respective context information including an identification of a respective mobile device with which the each respective request is associated, and an identification of a source of the each respective request;

identifying a subset of the requests, each of the subset of the requests including a valid pair of geographic coordinates;

for each IP address of a plurality of IP addresses, deriving geographical location information for the each IP address using geographic coordinates included in selected requests, each of the selected requests including the each IP address and having a valid pair of geographic coordinates; and storing the geographical location information together with the each IP address in an IP region database accessible by the one or more computer systems.

11. The method of claim 10, wherein the set of input signals include a particular IP address, and wherein deriving the location of the particular mobile device comprises searching in the IP region database for the geographical location information for the particular IP address.

12. The method of claim 11, further comprising:

in response to finding the particular IP address included in the set of input signals in the IP region database, deriving the location for the particular mobile device from the geographical location information for the particular IP address.

13. The method of claim 12, further comprising attaching a confidence factor to the location of the particular mobile device based on the geographical location information for the particular IP address included in the set of input signals.

14. The method of claim 13, wherein the geographical location information for the particular IP address includes data defining a particular geographic region and the confidence factor is dependent on a size of the particular geographic region.

15. The method of claim 9, wherein the fixed geographic region is a region selected from the group consisting of: a city, a town, a county, a state, a country, a region associated with a postal code, and a region associated with an area code.

16. The method of claim 9, further comprising:
   receiving requests associated with a plurality of mobile devices communicating with the packet-based network, each respective request including respective location components and respective context information, the respective location components including one or more of a respective set of geographic coordinates, a name of a first geographical region, and a code of a second geographical region, the respective context information including an identification of a mobile device with which the each respective request is associated, and an identification of a source of the each respective request; and
   for each source of a plurality of sources, providing a cache to store the set of geographical coordinates in each received request including an identification of the each source, determining whether the each source provides invalid geographical coordinates based on a number of unique sets of geographical coordinates in the cache as compared to a total number of received requests identifying the each source.

17. The method of claim 16, wherein each respective request further includes an Internet Protocol (IP) address, the method further comprising:
   deriving a plurality of dynamic centroids from the requests, the plurality of dynamic centroids including at least one of a first centroid and a second centroid, the first centroid being derived from a first subset of the requests received within a first predetermined time duration, each of the first subset of the requests including a same IP address and a set of geographic coordinates in a vicinity of a first geographical location, a number of requests in the first subset of the requests exceeding a first preset threshold, the second centroid being derived from a second subset of the requests received within a second predetermined time duration, each of the second subset of the requests including no IP address and a set of geographic coordinates in a vicinity of a second geographical location, a number of requests in the second subset of the requests exceeding a second preset threshold.

18. The method of claim 17, further comprising:
   determining whether the pair of latitude/longitude coordinates correspond to one of the plurality of dynamic centroids; and
   in response to the pair of latitude/longitude coordinates corresponding to a dynamic centroid, marking the pair of latitude/longitude coordinates as invalid.

* * * * *

UNITED STATES PATENT AND TRADEMARK OFFICE
CERTIFICATE OF CORRECTION

PATENT NO. : 10,089,653 B2
APPLICATION NO. : 15/890083
DATED : October 2, 2018
INVENTOR(S) : Muttineni et al.

Page 1 of 1

It is certified that error appears in the above-identified patent and that said Letters Patent is hereby corrected as shown below:

In the Claims

Claim 1, Column 23, Line 7, please delete "invalid;" and insert --invalid; and--.

Signed and Sealed this
Nineteenth Day of March, 2019

Andrei Iancu
*Director of the United States Patent and Trademark Office*